(12) United States Patent
Datta et al.

(10) Patent No.: US 8,999,907 B2
(45) Date of Patent: Apr. 7, 2015

(54) ETHYLENE BASED COPOLYMER COMPOSITIONS AS VISCOSITY MODIFIERS AND METHODS FOR MAKING THEM

(75) Inventors: Sudhin Datta, Houston, TX (US); Rainer Kolb, Kingwood, TX (US); Liehpao Oscar Farng, Lawrenceville, NJ (US); Vera Minak-Bernero, Bridgewater, NJ (US); Mun Fu Tse, Seabrook, TX (US); Eric B. Sirota, Flemington, NJ (US); Diana Smirnova, High Bridge, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 170 days.

(21) Appl. No.: 13/178,185

(22) Filed: Jul. 7, 2011

(65) Prior Publication Data
US 2012/0028867 A1    Feb. 2, 2012

Related U.S. Application Data

(60) Provisional application No. 61/368,473, filed on Jul. 28, 2010.

(51) Int. Cl.
| | | |
|---|---|---|
| *C10L 1/16* | (2006.01) | |
| *C08G 63/48* | (2006.01) | |
| *C08G 63/91* | (2006.01) | |
| *C08L 23/08* | (2006.01) | |
| *C08L 23/16* | (2006.01) | |
| *C10M 107/04* | (2006.01) | |
| *C10M 107/06* | (2006.01) | |
| *C10M 169/04* | (2006.01) | |

(52) U.S. Cl.
CPC .......... *C08L 23/0815* (2013.01); *C08L 23/08* (2013.01); *C08L 23/16* (2013.01); *C10M 107/04* (2013.01); *C10M 107/06* (2013.01); *C10M 169/047* (2013.01); *C10M 2203/1025* (2013.01); *C10M 2205/022* (2013.01); *C10M 2219/046* (2013.01); *C10N 2230/02* (2013.01); *C10N 2230/68* (2013.01); *C10N 2230/74* (2013.01)

(58) Field of Classification Search
CPC ................... C10M 2205/022; C10M 2205/08; C01M 2209/02
USPC ............................................. 508/591; 525/70
See application file for complete search history.

(56) References Cited

U.S. PATENT DOCUMENTS

| | | |
|---|---|---|
| 2,969,324 A | 1/1961 | Knapp, Jr. et al. |
| 3,697,429 A | 10/1972 | Engel et al. |
| 3,760,001 A | 9/1973 | Staendeke |
| 3,778,375 A | 12/1973 | Braid et al. |
| 3,779,928 A | 12/1973 | Schlict |
| 3,852,205 A | 12/1974 | Kablaoui et al. |
| 3,879,306 A | 4/1975 | Kablaoui et al. |
| 3,932,290 A | 1/1976 | Koch et al. |
| 3,933,659 A | 1/1976 | Lyle et al. |
| 4,028,258 A | 6/1977 | Kablaoui et al. |
| 4,105,571 A | 8/1978 | Shaub et al. |
| 4,176,074 A | 11/1979 | Coupland et al. |
| 4,344,853 A | 8/1982 | Gutierrez et al. |
| 4,464,493 A | 8/1984 | Joffrion |
| 4,507,515 A | 3/1985 | Johnston et al. |
| 4,540,753 A | 9/1985 | Cozewith et al. |
| 4,542,199 A | 9/1985 | Kaminsky et al. |
| 4,792,595 A | 12/1988 | Cozewith et al. |
| 4,804,794 A | 2/1989 | Ver Strate et al. |
| 4,871,705 A | 10/1989 | Hoel |
| 4,892,851 A | 1/1990 | Ewen et al. |
| 4,959,436 A | 9/1990 | Cozewith et al. |
| 5,008,204 A | 4/1991 | Stehling |
| 5,017,714 A | 5/1991 | Welborn, Jr. |
| 5,026,798 A | 6/1991 | Canich |

(Continued)

FOREIGN PATENT DOCUMENTS

| | | |
|---|---|---|
| EP | 0 277 003 | 8/1988 |
| EP | 0 277 004 | 8/1988 |

(Continued)

OTHER PUBLICATIONS

H. Brintzinger et al., "*ansa-Zirconocene Polymerization Catalysts with Annelated Ring Ligands—Effects on Catalytic Activity and Polymer Chain Length*", Organometallics, vol. 13, pp. 964-970 (1994).
H.N. Cheng et al., "$^{13}C$ *NMR Analysis of Compositional Heterogeneity in Ethylene-Propylene Copolymers*", Macromolecules, vol. 24, No. 8, pp. 1724-1726 (1991).
H.N. Cheng, "$^{13}C$ *NMR Analysis of Ethylene-Propylene Rubbers*", Macromolecules, vol. 17, No. 10, pp. 1950-1955 (1984), Macromolecules, vol. 17, No. 10, pp. 1950-1955 (1984).
C. Cozewith, "*Interpretation of $^{13}C$ NMR Sequence Distribution for Ethylene-Propylene Copolymers Made with Heterogeneous Catalysts*", vol. 20, No. 6, pp. 1237-1244 (1987).
C. Cozewith et al., "*Ethylene-Propylene Copolymers. Reactivity Ratios, Evaluation, and Significance*", Macromolecules, vol. 4, pp. 482-489 (1971).
Kakugo et al., "$^{13}C$ *NMR Determination of Monomer Sequence Distribution in Ethylene-Propylene Copolymers Prepared with with $\delta\text{-}TiCl_3\text{-}Al(C_2H_5)_2Cl$*", Macromolecules, vol. 15, No. 4, pp. 1150-1152 (1982).

(Continued)

Primary Examiner — Prem C Singh
Assistant Examiner — Francis C Campanell

(57) ABSTRACT

Polymeric compositions and methods for making and using the same are provided. The polymeric composition can include a first ethylene-based copolymer and a second ethylene-based copolymer. The first ethylene-based copolymer can have a weight percent of ethylene-derived units based on a weight of the polymeric composition ($E_A$) ranging from about 35 wt % to about 52 wt % and a weight-average molecular weight ($Mw_A$) of less than or equal to 130,000. The second ethylene-based copolymer can have a weight percent of ethylene-derived units based on the weight of the polymeric composition ($E_B$) ranging from about 65 wt % to about 85 wt % and a weight-average molecular weight ($Mw_B$) of less than 130,000.

21 Claims, No Drawings

(56) References Cited

U.S. PATENT DOCUMENTS

| | | | |
|---|---|---|---|
| 5,055,438 A | 10/1991 | Canich | |
| 5,068,047 A | 11/1991 | Chung et al. | |
| 5,096,867 A | 3/1992 | Canich | |
| 5,120,867 A | 6/1992 | Welborn, Jr. | |
| 5,132,262 A | 7/1992 | Reiger et al. | |
| 5,132,281 A | 7/1992 | Chevallier et al. | |
| 5,151,204 A | 9/1992 | Struglinski | |
| 5,153,157 A | 10/1992 | Hlatky et al. | |
| 5,155,080 A | 10/1992 | Elder et al. | |
| 5,198,401 A | 3/1993 | Turner et al. | |
| 5,243,001 A | 9/1993 | Winter et al. | |
| 5,264,405 A | 11/1993 | Canich | |
| 5,278,119 A | 1/1994 | Turner et al. | |
| 5,278,264 A | 1/1994 | Spaleck et al. | |
| 5,296,434 A | 3/1994 | Karl et al. | |
| 5,304,614 A | 4/1994 | Winter et al. | |
| 5,318,935 A | 6/1994 | Canich et al. | |
| 5,324,800 A | 6/1994 | Welborn, Jr. et al. | |
| 5,382,630 A | 1/1995 | Stehling et al. | |
| 5,387,568 A | 2/1995 | Ewen et al. | |
| 5,391,617 A | 2/1995 | Olivier et al. | |
| 5,391,629 A | 2/1995 | Turner et al. | |
| 5,446,221 A | 8/1995 | Struglinski | |
| 5,451,630 A | 9/1995 | Olivier et al. | |
| 5,451,636 A | 9/1995 | Olivier et al. | |
| 5,621,126 A | 4/1997 | Canich et al. | |
| 5,665,800 A | 9/1997 | Lai et al. | |
| 5,955,625 A | 9/1999 | Canich | |
| 5,969,070 A | 10/1999 | Waymouth et al. | |
| 6,034,187 A | 3/2000 | Maehama et al. | |
| 6,265,338 B1 | 7/2001 | Canich | |
| RE37,400 E | 10/2001 | Canich | |
| 6,319,998 B1* | 11/2001 | Cozewith et al. | 526/65 |
| 6,376,409 B1 | 4/2002 | Burkhardt et al. | |
| 6,376,412 B1 | 4/2002 | Burkhardt et al. | |
| 6,380,120 B1 | 4/2002 | Burkhardt et al. | |
| RE37,788 E | 7/2002 | Canich | |
| 6,589,920 B2 | 7/2003 | Okada et al. | |
| 6,638,887 B1 | 10/2003 | Canich | |
| 6,753,381 B2* | 6/2004 | Mishra et al. | 525/240 |
| 6,881,800 B2 | 4/2005 | Friedersdorf | |
| 7,163,907 B1 | 1/2007 | Canich et al. | |
| 7,232,871 B2 | 6/2007 | Datta et al. | |
| 7,452,597 B2 | 11/2008 | Bujard | |
| 7,569,646 B1 | 8/2009 | Canich | |
| 8,389,452 B2* | 3/2013 | Datta et al. | 508/591 |
| 2002/0055445 A1 | 5/2002 | Okada et al. | |
| 2003/0176579 A1 | 9/2003 | Mishra et al. | |
| 2004/0038850 A1 | 2/2004 | Huang | |
| 2004/0121922 A1 | 6/2004 | Okada et al. | |
| 2007/0167315 A1 | 7/2007 | Arriola et al. | |
| 2009/0209721 A1 | 8/2009 | Ikeda et al. | |
| 2010/0273693 A1 | 10/2010 | Datta et al. | |
| 2012/0028865 A1* | 2/2012 | Datta et al. | 508/591 |
| 2012/0028866 A1* | 2/2012 | Datta et al. | 508/591 |

FOREIGN PATENT DOCUMENTS

| | | |
|---|---|---|
| EP | 0 287 239 | 10/1988 |
| EP | 0 426 637 | 5/1991 |
| EP | 0 427 697 | 5/1991 |
| EP | 0 495 375 | 7/1992 |
| EP | 0 500 944 | 9/1992 |
| EP | 0 511 665 | 11/1992 |
| EP | 0 520 732 | 12/1992 |
| EP | 0 570 982 | 11/1993 |
| EP | 0 573 403 | 12/1993 |
| EP | 0 577 581 | 1/1994 |
| EP | 0 578 838 | 1/1994 |
| EP | 0 612 768 | 8/1994 |
| EP | 0 637 611 | 2/1995 |
| EP | 0 638 611 | 2/1995 |
| EP | 1 148 115 | 10/2001 |
| EP | 1 178 102 | 2/2002 |
| EP | 1 262 498 | 12/2002 |
| WO | WO 92/00333 | 1/1992 |
| WO | WO 93/10495 | 5/1993 |
| WO | WO 93/19103 | 9/1993 |
| WO | WO 99/07788 | 2/1999 |
| WO | WO 99/29743 | 6/1999 |
| WO | WO 99/45062 | 9/1999 |
| WO | WO 99/60033 | 11/1999 |
| WO | WO 01/48034 | 7/2001 |
| WO | WO 02/46251 | 6/2002 |
| WO | WO 03/040201 | 5/2003 |
| WO | WO 2006/102146 | 9/2006 |
| WO | WO 2009/012153 | 1/2009 |
| WO | WO 2010/126721 | 11/2010 |

OTHER PUBLICATIONS

A.C. Ouano, "*Gel Permeation Chromatography*", Polymer Molecular Weights Part II, ed. P.E. Slade, ed., Marcel Dekker, Inc., NY, pp. 287-368 (1975).

J.C. Randall, "*Methylene Sequence Distributions and Number Average Sequence Lengths in Ethylene-Propylene Copolymers*", Macromolecules, vol. 11, No. 1, pp. 33-36 (1978).

G.J. Ray et al., "*Carbon-13 Nuclear Magnetic Resonance Determination of Monomer Composition and Sequence Distributions in Ethylene-Propylene Copolymers Prepared with a Stereoregular Catalyst System*", Macromolecules, vol. 10, No. 4, pp. 773-778 (1977).

F. Rodriguez, "*The Molecular Weight of Polymers*", Principles of Polymer System, $3^{rd}$ ed., Hemisphere Pub. Corp., NY, pp. 155-160 (1989).

W. Spaleck et al., "*The Influence of Aromatic Substituents on the Polymerization Behavior of Bridged Zirconocene Catalysts*", Organometallics, vol. 13, pp. 954-963 (1994).

Sun et al., "*Effect of Short Chain Branching on the Coil Dimensions of Polyolefins in Dilute Solution*", Macromolecules, vol. 34, No. 19, pp. 6812-6820 (2001).

Sun et al., "*A Study of the Separation Principle in Size Exclusion Chromatography*", Macromolecules, vol. 37, No. 11, pp. 4304-4312 (2004).

G. Ver Strate et al., "*Near Monodisperse Ethylene-Propylene Copolymers by Direct Ziegler-Natta Polymerization. Preparation, Characterization, Properties*", Macromolecules, vol. 21, pp. 3360-3371 (1988).

Wild et al., "*Determination of Branching Districutions in Polyethylene and Ethylene Copolymers*", J. Poly Sci., Poly. Phys. Ed., vol. 20, pp. 441-455 (1982).

Wittig, H. et al., "Über neue Triaryl-bor-Ver-bindungen und ihre Tetraarylo-borat-Komplexe (V. Mittel.[1])," Chemische Berichte, vol. 88, pp. 962-976 (1955).

U.S. Appl. No. 60/243,192, "*Processes and Apparatus for Continuous Solution Polymerization*", filed Oct. 25, 2000.

\* cited by examiner

ETHYLENE BASED COPOLYMER COMPOSITIONS AS VISCOSITY MODIFIERS AND METHODS FOR MAKING THEM

PRIORITY CLAIM

This application claims priority to and the benefit of Provisional Application No. 61/368,473, filed Jul. 28, 2010, the disclosure of which is incorporated by reference in its entirety.

CROSS REFERENCE TO RELATED APPLICATIONS

This application is related to U.S. application Ser. No. 12/761,880, filed Apr. 28, 2009, U.S. application Ser. No. 12/762,096, filed Apr. 28, 2009, and U.S. application Ser. No. 12/569,009, filed Sep. 29, 2009, U.S. patent application Ser. No. 13/006,057, filed Jan. 13, 2011, and U.S. patent application Ser. No. 13/006,042, filed Jan. 13, 2011, the disclosures of which are incorporated by reference in their entireties

FIELD OF THE INVENTION

This disclosure relates to rheology modifiers and methods for making same. More particularly, this disclosure relates to compositionally disperse polymeric compositions and/or crystallinity disperse polymeric compositions that are useful in modifying the rheological properties of fluids and methods for making such compositions.

BACKGROUND OF THE INVENTION

Lubrication fluids are typically applied to moving surfaces to reduce friction between surfaces, thereby improving efficiency and reducing wear. Lubrication fluids are also typically used to dissipate heat generated by the moving surfaces. One type of lubrication fluid is a petroleum-based lubrication oil. Such lubrication oil is typically used for internal combustion engines. Lubrication oils contain additives that help the lubrication oil to have a certain viscosity at a given temperature.

In general, the viscosity of lubrication oils and fluids are inversely dependent upon temperature. When the temperature of lubrication fluids is increased, the viscosity of such fluids generally decreases, and when the temperature is decreased, the viscosity of such fluids generally increases. For internal combustion engines, it is desirable to have lower viscosity at low temperatures to facilitate engine starting during cold weather, and a higher viscosity at higher ambient temperatures when lubrication properties typically decline.

Additives for such lubrication fluids and oils include rheology modifiers, including viscosity index (VI) improvers. Components of VI improvers derived from ethylene-alpha-olefin copolymers modify the rheological behavior to increase the lubricant viscosity and promote a more constant viscosity over a wider range of temperatures. Such VI improvers with higher ethylene contents can improve oil thickening (TE) and shear stability, as measured by shear stability index ("SSI"). Higher ethylene content VI improvers, however, tend to flocculate or aggregate in oil formulations leading to highly viscous, flocculated materials that precipitate out of the lubrication fluid. These precipitates are apparent as regions (e.g., "lumps") of high viscosity or essentially complete solidification (e.g., "gels") and can lead to clogs and blockages of pumps and other passageways for the lubrication fluid and can lead to harm and in some causes failure of moving machinery.

Blends of amorphous and semi-crystalline ethylene-based copolymers have been used to overcome or mitigate the propensity towards the formation of high viscosity flocculated materials. See, e.g., U.S. Pat. Nos. 7,402,235 and 5,391,617, and European Patent No. 0 638 611, the disclosures of which are incorporated herein by reference. There remains a need, however, for new rheology modifier compositions made from ethylene that are suitable for use in VI improvers that have high TE and good low temperature solution rheology properties.

SUMMARY OF THE INVENTION

Polymeric compositions and methods for making and using the same are provided. In at least one specific embodiment, the polymeric composition can include a first ethylene-based copolymer and a second ethylene-based copolymer. The first ethylene-based copolymer can have a weight percent of ethylene-derived units based on a weight of the polymeric composition ($E_A$) ranging from about 35 wt % to about 52 wt % and a weight-average molecular weight ($Mw_A$) of less than or equal to 130,000. The second ethylene-based copolymer can have a weight percent of ethylene-derived units based on the weight of the polymeric composition ($E_B$) ranging from about 65 wt % to about 85 wt % and a weight-average molecular weight ($Mw_B$) of less than 130,000.

In at least one other specific embodiment, the polymeric composition can include a first ethylene-based copolymer and a second ethylene-based copolymer. The first ethylene-based copolymer can have a heat of fusion on a first melt of the first ethylene-based copolymer ($H_A$) ranging from about 0 J/g to about 15 J/g and a weight-average molecular weight ($Mw_A$) of less than 130,000. The second ethylene-based copolymer can have a heat of fusion on a first melt of the second ethylene-based copolymer ($H_B$) ranging from about 30 J/g to about 60 J/g and a weight-average molecular weight ($Mw_B$) of less than or equal to 130,000.

In at least one specific embodiment, a lubrication oil composition can include a base oil and a polymeric composition. The polymeric composition can include a first ethylene-based copolymer and a second ethylene-based copolymer. The first ethylene-based copolymer can have a weight percent of ethylene-derived units based on a weight of the polymeric composition ($E_A$) ranging from about 35 wt % to about 52 wt % and a weight-average molecular weight ($Mw_A$) of less than or equal to 130,000. The second ethylene-based copolymer can have a weight percent of ethylene-derived units based on the weight of the polymeric composition ($E_B$) ranging from about 65 wt % to about 85 wt % and a weight-average molecular weight ($Mw_B$) of less than 130,000.

In at least one specific embodiment, a lubrication oil composition can include a base oil and a polymeric composition. The polymeric composition can include a first ethylene-based copolymer and a second ethylene-based copolymer. The first ethylene-based copolymer can have a heat of fusion on a first melt of the first ethylene-based copolymer ($H_A$) ranging from about 0 J/g to about 15 J/g and a weight-average molecular weight ($Mw_A$) of less than 130,000. The second ethylene-based copolymer can have a heat of fusion on a first melt of the second ethylene-based copolymer ($H_B$) ranging from about 30 J/g to about 60 J/g and a weight-average molecular weight ($Mw_B$) of less than or equal to 130,000.

DETAILED DESCRIPTION OF THE INVENTION

Rheology modifier compositions or "polymeric compositions" made from ethylene-based copolymers that are suitable for use in VI improvers are provided. The ethylene-based copolymers provided herein exhibit surprisingly increased TE and SSI with excellent low temperature viscosity performance and/or pour point. The ethylene-based copolymers can include two or more compositionally disperse polymeric compositions and/or two or more crystallinity disperse polymeric compositions. The compositionally disperse polymeric composition are formed from at least two discrete ethylene-based copolymers having different ethylene contents, heats of fusion, molecular weights (Mn and Mw), melt index and intermolecular composition distribution, and any combination thereof. The crystallinity disperse polymeric compositions can be formed from at least two discrete ethylene-based copolymers having different values of residual crystallinity.

Not wishing to be bound by theory, it is believed that the distribution of the monomers and the chain architecture are controlled and segregated into at least two compositionally disperse or crystallinity disperse polymeric populations. These disperse polymeric populations can be formed by a synthesis process that employs metallocene-based catalysts. And contrary to conventional thought, there is a preferred relationship between the amount and composition of the discrete distributions of the ethylene-based copolymers.

DEFINITIONS

For purposes of this inventions and the claims thereto, the definitions set forth below are used.

As used herein, the term "complex viscosity" means a frequency-dependent viscosity function determined during forced small amplitude harmonic oscillation of shear stress, in units of Pascal-seconds, that is equal to the difference between the dynamic viscosity and the out-of-phase viscosity (imaginary part of complex viscosity).

As used herein, the term "Composition Distribution Breadth Index" (CDBI) is defined in U.S. Pat. No. 5,382,630, which is incorporated by reference herein. CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in L. Wild, et al., "Determination of Branching Distributions in Polyethylene and Ethylene Copolymers," JOURNAL OF POLYMER SCIENCE: POLYMER PHYSICS EDITION, Vol. 20, pp. 441-455 (1982) and U.S. Pat. No. 5,008,204, both of which are incorporated herein by reference.

As used herein, the term "compositionally disperse" means a polymeric composition comprised of at least two discrete compositions of ethylene-based copolymers.

As used herein, the term "copolymer" includes any polymer having two or more monomers.

As used herein, the term "crystallinity disperse" means a polymeric composition comprised of at least two ethylene-based copolymers having two discrete values of residual crystallinity.

As used herein, the term "disperse" means that the compositions include constituent polymer fractions which have different compositions and/or different crystallinity due, in part, to different molecular weight distributions, and/or different monomer compositional or sequence distributions.

As used herein, the term "$E_A$" means the weight percent of ethylene-derived units of the first ethylene-based copolymer based on the weight of the polymeric composition.

As used herein, the term "$E_B$" means the weight percent of ethylene-derived units of the second ethylene-based copolymer based on the weight of the polymeric composition.

As used herein, the term "ethylene-based copolymer" means an ethylene-based copolymer comprised of ethylene and one or more comonomers.

As used herein, the term "$H_A$" means the heat of fusion in units of joules/gram on a first melt of the first ethylene-based copolymer.

As used herein, the term "$H_B$" means the heat of fusion in units of joules/gram on the first melt of the second ethylene-based copolymer.

As used herein, the term "intermolecular composition distribution," (InterCD or intermolecular CD), defines the compositional heterogeneity in terms of ethylene content, among polymer chains. It is expressed as the minimum deviation, analogous to a standard deviation, in terms of weight percent ethylene from the average ethylene composition for a given copolymer sample needed to include a given weight percent of the total copolymer sample, which is obtained by excluding equal weight fractions from both ends of the distribution. The deviation need not be symmetrical. When expressed as a single number, for example, an intermolecular composition distribution of 15 wt % shall mean the larger of the positive or negative deviations. For example, at 50 wt % intermolecular composition distribution the measurement is akin to conventional composition distribution breadth index.

As used herein, the term "intramolecular composition distribution" (IntraCD or intramolecular CD) defines the compositional variation, in terms of ethylene, within a copolymer chain. It is expressed as the ratio of the alpha-olefin to ethylene along the segments of the same chain.

As used herein, the term "$MI_A$" means the melt index in units of g/10 min or dg/min of the first ethylene-based copolymer.

As used herein, the term "$MI_B$" means the melt index in units of g/10 min or dg/min of the second ethylene-based copolymer.

As used herein, the term "$Mn_A$" means the number-average molecular weight of the first ethylene-based copolymer as measured by GPC.

As used herein, the term "$Mn_B$" means the number-average molecular weight of the second ethylene-based copolymer as measured by GPC.

As used herein, the term "$Mw_A$" means the weight-average molecular weight of the first ethylene-based copolymer in units of grams/mole in terms of polystyrene, as measured by GPC.

As used herein, the term "$Mw_B$" means the weight-average molecular weight of the second ethylene-based copolymer in units of grams/mole in terms of polystyrene, as measured by GPC.

As used herein, the term "MWD" means the ratio of Mw to Mn.

As used herein, the term "melting point" means the highest peak among principal and secondary melting peaks as determined by DSC during the second melt, as discussed herein.

As used herein, the term "polyene" means monomers or polymers having two or more unsaturations, e.g., dienes, trienes, and the like.

As used herein, the term "polypropylene" means a polymer made of at least 50% propylene units, preferably at least 70% propylene units, more preferably at least 80% propylene units, even more preferably at least 90% propylene units, even more preferably at least 95% propylene units or 100% propylene units.

As used herein, the term "substantially linear structure" means that the first ethylene-based copolymer and/or the second ethylene-based copolymer is characterized as having less than 1 branch point pendant with a carbon chain larger than 19 carbon atoms per 200 carbon atoms along a backbone.

When a polymer or copolymer is referred to as comprising an olefin, including, but not limited to ethylene, propylene, and butene, the olefin present in such polymer or copolymer is the polymerized form of the olefin.

Polymeric Compositions

The rheology modifier composition preferably includes at least one first ethylene-based copolymer and at least one second ethylene-based copolymer. The first ethylene-based copolymer includes ethylene and at least one alpha-olefin comonomer, and optionally one or more internal olefins, and optionally one or more polyenes. Similarly, the second ethylene-based copolymer includes ethylene and at least one alpha-olefin comonomer, and optionally one or more internal olefins, and optionally one or more polyenes. The first and second ethylene-based copolymers, however, have different ethylene contents, heats of fusion, molecular weights (Mn and Mw), melt index, intermolecular composition distribution, and/or crystallinity. Unless otherwise specified, all references to a first ethylene-based copolymer and a second ethylene-based copolymer refer to both the compositionally disperse polymeric compositions and the crystallinity disperse polymeric compositions.

The $E_A$ in wt % of the first ethylene-based copolymer is preferably in the range of $35 \leq E_A \leq 55$; in some embodiments, in the range of $40 \leq E_A \leq 53$; in other embodiments, in the range of $45 \leq E_A \leq 53$; and in still yet other embodiments $E_A$ is in the range of about $47 \leq E_A \leq 52$. The first ethylene-based copolymer can have a weight percent of ethylene-derived units based on the weight of the polymeric composition ($E_A$) ranging from a low of about 30 wt %, about 33 wt %, about 35 wt %, about 37 wt %, or about 40 wt % to a high of about 45 wt %, about 47 wt %, about 50 wt %, about 52 wt %, or about 54 wt %.

The $E_B$ in wt % of the second ethylene-based copolymer is in the range of $35 \leq E_B \leq 85$; in some embodiments, in the range of $55 \leq E_B \leq 80$; in other embodiments, in the range of $65 \leq E_B \leq 80$; in still other embodiments, in the range of $67 \leq E_B \leq 80$; and still yet other embodiments $67 \leq E_B \leq 77$; and still yet other embodiments $E_B$ is about 73. The second ethylene-based copolymer can have a weight percent of ethylene-derived units based on the weight of the polymeric composition ($E_B$) ranging from a low of about 60 wt %, about 63 wt %, about 65 wt %, about 67 wt %, or about 70 wt % to a high of about 80 wt %, about 83 wt %, about 85 wt %, or about 87 wt %.

In some embodiments, the ethylene weight percent $E_A$ of the first ethylene-based copolymer may be less than the ethylene weight percent $E_B$ of the second ethylene-based copolymer for the polymeric composition. In some embodiments, the compositionally disperse polymeric compositions may be characterized by the difference in the ethylene weight percent, $E_B$ and $E_A$. In some embodiments, $E_B - E_A \geq 12$; in other embodiments, $E_B - E_A \geq 17$; in still other embodiments, $E_B - E_A \geq 21$; in still yet other embodiments, $E_B - E_A \geq 23$. In some embodiments, the difference in ethylene weight percent, $E_B$ and $E_A$, is in the range of $17 \leq E_B - E_A \leq 23$; in other embodiments, the difference in $E_B$ and $E_A$ is about 21. The difference between the weight percent of ethylene-derived units of the second ethylene-based copolymer based on the weight of the polymeric composition and the weight percent of the ethylene-derived units in the first ethylene-based copolymer based on the weight of the polymeric composition can range from a low of about 12, about 14, about 16, or about 18 to a high of about 20, about 22, about 23, or abut 24.

The $H_A$ of the first ethylene-based copolymer is in the range of $0 \leq H_A \leq 30$; in some embodiments, in the range of $0 \leq H_A \leq 15$; in other embodiments, in the range of $0 \leq H_A \leq 10$; in still other embodiments, in the range of $0 \leq H_A \leq 5$; and in still yet other embodiments, $H_A$ is about 2. In one or more embodiments, the first ethylene-based copolymer can have a heat of fusion on a first melt of the first ethylene-based copolymer ($H_A$) ranging from a low of about 0 J/g, about 1 J/g, or about 2 J/g to a high of about 8 J/g, about 9 J/g, or about 10 J/g.

The $H_B$ of the second ethylene-based copolymer is in the range of $30 < H_B \leq 60$; in some embodiments, in the range of $35 < H_B \leq 55$; in other embodiments, in the range of $40 < H_B \leq 50$; and still yet other embodiments $H_B$ is about 45. In one or more embodiments, the second ethylene-based copolymer can have a heat of fusion on a first melt of the second ethylene-based copolymer ($H_B$) ranging from a low of about 30 J/g, about 33 J/g, about 35 J/g, or about 37 J/g to a high of about 47 J/g, about 50 J/g, about 53 J/g, about 57 J/g, or about 60 J/g.

In some embodiments, the heat of fusion $H_A$ of the first ethylene-based copolymer may be less than the heat of fusion $H_B$ of the second ethylene-based copolymer. In some embodiments, the crystallinity disperse polymeric compositions may be characterized by the difference in the heat of fusion, $H_B$ and $H_A$. In some embodiments, $H_B - H_A \geq 4$; in other embodiments, $H_B - H_A \geq 8$; in still other embodiments, $H_B - H_A \geq 12$; in still yet other embodiments, $H_B - H_A \geq 16$. In some embodiments, the difference in the heat of fusion, $H_B$ and $H_A$, is in the range of $8 \leq H_B - H_A \leq 10$; in other embodiments, the difference in $H_B$ and $H_A$ is about 9.

The first ethylene-based copolymer may be characterized by a weight-average molecular weight ($Mw_A$) of less than or equal to 130,000, or less than 120,000, or less than 110,000, or less than 100,000, or less than 90,000, or less than 80,000, or less than 70,000. Preferably, the $Mw_A$ is from 70,000 to 95,000. In one or more embodiments, the first ethylene-based copolymer can have a weight-average molecular weight ($Mw_A$) ranging from a low of about 60,000, about 65,000, about 70,000, or about 75,000 to a high of about 90,000, about 95,000, about 100,000, about 105,000, or about 115,000.

The second ethylene-based copolymer may be characterized by a weight-average molecular weight ($Mw_B$) of less than or equal to 130,000, or less than 120,000, or less than 110,000, or less than 100,000, or less than 90,000, or less than 80,000, or less than 70,000. Preferably, the $Mw_B$ is from 70,000 to 95,000. In one or more embodiments, the second ethylene-based copolymer can have a weight-average molecular weight ($Mw_B$) ranging from a low of about 60,000, about 65,000, about 70,000, or about 75,000 to a high of about 90,000, about 95,000, about 100,000, about 105,000, or about 115,000.

In some embodiments, $MI_A/MI_B$ is less than or equal to 3, less than or equal to 2, less than or equal to 1. The ratio of the melt index of the first ethylene-based copolymer ($MI_A$) to the melt index of the second ethylene-based copolymer ($MI_B$) of the polymeric composition can be less than about 3.0, less than about 2.8, less than about 2.6, less than about 2.4, less than about 2.2, less than about 1.8, or less than about 1.6.

The compositionally disperse and/or crystallinity disperse polymeric compositions may be further characterized by the absolute value of the difference in the melt index of the first ethylene-based copolymer $MI_A$ and the melt index of the second ethylene-based copolymer $MI_B$. In some embodiments, $|MI_A - MI_B| \leq 3.0$; in other embodiments, $|MI_A - MI_B| \leq 2.5$; in still yet other embodiments, $|MI_A - MI_B| \leq 2.0$; in still yet other embodiments, $|MI_A-MI_B|\leq 1.5$; in still yet other embodiments, $|MI_A-MI_B|\leq 1.1$; and still yet other embodiments, $|MI_A-MI_B|\leq 1.0$.

The melt flow rate (MFR) of the compositionally disperse and/or crystallinity disperse polymeric compositions will be intermediate to the MFR of the lower and higher ethylene content copolymers when these copolymers have different MFRs. The lower ethylene content copolymer can have an MFR of from 0.2 to 25. The higher ethylene content copolymer can have an MFR of from 0.2 to 25.

The first and/or second ethylene-based copolymers can have a MWD of less than 3.0, or less than 2.4, or less than 2.2, or less than 2.0. Preferably, the MWD for the first ethylene-based copolymer and/or the second ethylene-based copolymer is in the range of greater than or equal to 1.80 to less than or equal to 1.95.

In some embodiments, the comonomer insertion sequences of the first ethylene-based copolymer and the second copolymer polymer fractions can be the same or different. The insertion sequences can provide linear polymer structure or substantially linear polymer structure. The substantially linear structure of either the first ethylene-based copolymer and/or the second ethylene-based copolymer has less than 1 branch point pendant with a carbon chain larger than 19 carbon atoms per 200 carbon atoms along a backbone, less than 1 branch point pendant with a carbon chain larger than 19 carbon atoms per 300 branch points, less than 1 branch point pendant with a carbon chain larger than 19 carbon atoms per 500 carbon atoms, and preferably less than 1 branch point pendant with a carbon chain larger than 19 carbon atoms per 1000 carbon atoms notwithstanding the presence of branch points due to incorporation of the comonomer.

Comonomer Components

Suitable comonomers include, but are not limited to, propylene ($C_3$) and other alpha-olefins, such as $C_4$ to $C_{20}$ alpha-olefins (also referred to herein as "α-olefins"), and preferably propylene and $C_4$ to $C_{12}$ α-olefins. The α-olefin comonomer can be linear or branched, and two or more comonomers can be used, if desired. Thus, reference herein to "an alpha-olefin comonomer" includes one, two, or more alpha-olefin comonomers.

Examples of suitable comonomers include propylene, linear $C_4$ to $C_{12}$ α-olefins, and α-olefins having one or more $C_1$ to $C_3$ alkyl branches. Specific examples include: propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include: propylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituents on any of $C_3$ to $C_5$, 1-pentene with two methyl substituents in any stoichiometrically acceptable combination on $C_3$ or $C_4$, 3-ethyl-1-pentene, 1-octene, 1-pentene with a methyl substituents on any of $C_3$ or $C_4$, 1-hexene with two methyl substituents in any stoichiometrically acceptable combination on $C_3$ to $C_5$, 1-pentene with three methyl substituents in any stoichiometrically acceptable combination on $C_3$ or $C_4$, 1-hexene with an ethyl substituents on $C_3$ or $C_4$, 1-pentene with an ethyl substituents on $C_3$ and a methyl substituents in a stoichiometrically acceptable position on $C_3$ or $C_4$, 1-decene, 1-nonene, 1-nonene with a methyl substituents on any of $C_3$ to $C_9$, 1-octene with two methyl substituents in any stoichiometrically acceptable combination on $C_3$ to $C_7$, 1-heptene with three methyl substituents in any stoichiometrically acceptable combination on $C_3$ to $C_6$, 1-octene with an ethyl substituents on any of $C_3$ to $C_7$, 1-hexene with two ethyl substituents in any stoichiometrically acceptable combination on $C_3$ or $C_4$, and 1-dodecene.

Other suitable comonomers can include internal olefins. Preferred internal olefins are cis 2-butene and trans 2-butene. Other internal olefins are contemplated. When an internal olefin is present, negligible amounts, such as about 2 wt % or less of the total amount of the internal olefin, can be present in the low ethylene-content copolymer, and most of the internal olefin, such as about 90 wt % or more of the total amount of the internal olefin, can be present in the high ethylene-content copolymer.

Suitable comonomers can also include one or more polyenes. Suitable polyenes can include non-conjugated dienes, preferably those that are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene, norbornadiene, methyl-tetrahydroindene, dicyclopentadiene (DCPD), bicyclo-(2.2.1)-hepta-2,5-diene, alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene; and vinyl cyclododecene. Of the non-conjugated dienes typically used, the preferred dienes are dicyclopentadiene (DCPD), 1,4-hexadiene, 1,6-octadiene; 5-methyl-1,4-hexadiene; 3,7-dimethyl-1,6-octadiene; 5-methylene-2-norbornene, 5-ethylidene-2-norbornene (ENB), and tetracyclo(Δ-11,12) 5,8 dodecene. It is preferred to use dienes which do not lead to the formation of long chain branches, and non- or lowly branched polymer chains are preferred. Other polyenes that can be used include cyclopentadiene and octatetraene; and the like.

When a polyene is present, the ethylene-based copolymers can include up to 5 mol %, up to 4 mol %, up to 3 mol %, up to 2 mol %, and up to 1 mol % polyene-derived units. In some embodiments, the amount of polyene, when present, can range from about 0.5 mol % to about 4 mol %; about 1.0 mol % to about 3.8 mol %; or about 1.5 mol % to about 2.5 mol %.

Resulting Composition Blend

The discrete ethylene-based copolymers can be combined such that the less crystalline ethylene-based copolymer (typically the ethylene-based copolymer with a lower wt % ethylene) can be present in an amount no greater than about 66 wt %, based on the combined weight of the first and second ethylene-based copolymers. The first and second ethylene-based copolymers can also be combined in a predetermined weight ratio such that the ethylene-based copolymer with greater crystallinity (typically the ethylene-based copolymer with a higher wt % ethylene) can be present in an amount no less than about 44 wt %, based on the combined weight of the first and second ethylene-based copolymers. In one or more embodiments, the less crystalline ethylene-based copolymer can be present in an amount less than about 65 wt %, less than about 60 wt %, less than about 55 wt %, less than about 50 wt %, or less than about 45 wt %, based on the combined weight of the first and second ethylene-based copolymers.

The polymeric composition can have a concentration or content of ethylene-derived units ranging from about 70 mol % to about 85 mol %. For example, the polymeric composition can have a concentration of ethylene-derived units ranging from a low of about 70 mol %, about 72 mol %, or about 74 mol % to a high of about 78 mol %, about 80 mol %, about 83 mol %, or about 85 mol %. The MFR of the polymeric composition can be intermediate to the MFR of the lower and higher ethylene content copolymers when the first and second copolymers have different MFRs.

The lower ethylene content copolymer, i.e., the first ethylene-based copolymer, can have a concentration or content of ethylene-derived units ranging from about 50 mol % to about 70 mol % and a content of comonomer-derived units ranging from about 50 mol % to about 30 mol %. The lower ethylene content copolymer can also have an MFR ranging from about 0.2 to about 25. The lower ethylene content copolymer can also have a molecular weight distribution (Mw/Mn) of from about 1.5 to about 3.

The amount of ethylene-derived units in the higher ethylene content copolymer, i.e., the second ethylene-based copolymer, can be greater than about 70 mol %, greater than about 74 mol %, or greater than about 78 mol %. The higher ethylene content copolymer can also have an MFR ranging from about 0.2 to about 25. The higher ethylene content copolymer can also have a molecular weight distribution (Mw/Mn) ranging from about 1.5 to about 3.

Catalyst

The terms "metallocene" and "metallocene catalyst precursor," as used herein, refer to compounds possessing a transition metal M, with cyclopentadienyl (Cp) ligands, at least one non-cyclopentadienyl-derived ligand X, and zero or one heteroatom-containing ligand Y, the ligands being coordinated to M and corresponding in number to the valence thereof. The metallocene catalyst precursors are generally neutral complexes but when activated with a suitable cocatalyst yield an active metallocene catalyst which refers generally to an organometallic complex with a vacant coordination site that can coordinate, insert, and polymerize olefins. The metallocene catalyst precursor is preferably one of, or a mixture of metallocene compounds, of either or both of the following types:

(1) cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula:

$$(Cp^1R^1_m)R^3_n(Cp^2R^2_p)MX_q$$

where $Cp^1$ of ligand $(Cp^1R^1_m)$ and $Cp^2$ of ligand $(Cp^2R^2_p)$ are the same or different cyclopentadienyl rings; $R^1$ and $R^2$ each is, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; and two $R^1$ and/or $R^2$ substituents on adjacent carbon atoms of the cyclopentadienyl ring associated there with can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; q is equal to the valence of M minus 2;

(2) monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or VIA of the periodic table of the elements. These mono-cyclopentadienyl complexes have the general formula:

$$(Cp^1R^1_m)R^3_n(Y_rR^2)MX_s$$

wherein $R^1$ is, each independently, a halogen or a hydrocarbyl, halocarbyl, hydrocarbyl-substituted organometalloid or halocarbyl-substituted organometalloid group containing up to about 20 carbon atoms; m is 0 to 5; and two $R^1$ substituents on adjacent carbon atoms of the cyclopentadienyl ring associated therewith can be joined together to form a ring containing from 4 to about 20 carbon atoms; $R^3$ is a bridging group; n is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group VA or a coordination number of two from group VIA preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and when Y is three coordinate and unbridged there may be two R groups on Y each independently a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; s is equal to the valence of M minus 2.

Examples of suitable biscyclopentadienyl metallocenes of the type described in group 1 above can be as discussed and described in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, which are incorporated by reference herein.

Non-Coordinating Anions

The term "noncoordinating anion" (NCA) means an anion which either does not coordinate to the transition metal cation or which is only weakly coordinated to the cation thereby remaining sufficiently labile to be displaced by a neutral Lewis base. "Compatible" noncoordinating anions are those which are not degraded to neutrality when the initially formed complex decomposes. Further, the anion will not transfer an anionic substituents or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, and yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. NCAs are preferred because of their ability to produce a target molecular weight polymer at a higher temperature than tends to be the case with other activation systems such as alumoxane.

Descriptions of ionic catalysts for coordination polymerization using metallocene cations activated by non-coordinating anions appear in the early work in EP-A-0 277 003, EP-A-0 277 004, WO 92/00333 and U.S. Pat. Nos. 5,198,401 and 5,278,119, which are incorporated by reference herein. These references disclose a preferred method of preparation where metallocenes (bisCp and monoCp) are protonated by an anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion are also known. See, e.g., EP-A-0 426 637, EP-A-0 573 403 and U.S. Pat. No. 5,387,568, which are incorporated by reference herein. Reactive cations other than Bronsted acids capable of ionizing the metallocene compounds include ferrocenium triphenylcarbonium and triethylsilylinium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like.

An additional method for making the ionic catalysts uses ionizing anionic precursors which are initially neutral Lewis acids but form the cation and anion upon ionizing reaction with the metallocene compounds, for example, tris(pentafluorophenyl) boron acts to abstract an alkyl, hydride or silyl ligand to yield a metallocene cation and stabilizing non-coordinating anion. See, e.g., EP-A-0 427 697 and EP-A-0 520 732, which are incorporated by reference herein. Ionic catalysts for addition polymerization can also be prepared by oxidation of the metal centers of transition metal compounds by anionic precursors containing metallic oxidizing groups along with the anion groups. See, e.g., EP-A-0 495 375, which is incorporated by reference here.

Non-Ionic Activators

Where the metal ligands include halide moieties, for example, (methyl-phenyl) silylene (tetra-methyl-cyclopentadienyl) (tert-butyl-amido) zirconium dichloride, which are not capable of ionizing abstraction under standard conditions, they can be converted via known alkylation reactions with organometallic compounds such as lithium or aluminum hydrides or alkyls, alkylalumoxanes, Grignard reagents, etc. See, e.g., EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger its use in excess of that normally stoichiometrically required for alkylation of the metallocene will permit its addition to the reaction solvent with the metallocene compound. Normally, alumoxane would not be added with the metallocene so as to avoid premature activation, but can be added directly to the reaction vessel in the presence of the polymerizable monomers when serving as both scavenger and alkylating activator. Alumoxanes may also fulfill a scavenging function.

Known alkylalumoxanes are additionally suitable as catalyst activators, particularly for those metallocenes comprising halide ligands. The alumoxane component useful as catalyst activator typically is an oligomeric aluminum compound represented by the general formula (R—Al—O)n, which is a cyclic compound, or R(R—Al—O)$_n$AlR$_2$, which is a linear compound. In the general alumoxane formula R is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Polymerization Process

Each discrete ethylene-based copolymer can be polymerized in a single, well stirred tank reactor in solution. The viscosity of the solution during polymerization can be less than 10000 cps, or less than 7000 cps, and preferably less than 500 cps. The reactor is preferably a liquid filled, continuous flow, stirred tank reactor providing full back mixing for random copolymer production. Solvent, monomers, and catalyst(s) are fed to the reactor. When two or more reactors are utilized, solvent, monomers, and/or catalyst(s) is fed to the first reactor or to one or more additional reactors.

Reactors may be cooled by reactor jackets or cooling coils, autorefrigeration, prechilled feeds or combinations of all three to absorb the heat of the exothermic polymerization reaction. Autorefrigerated reactor cooling requires the presence of a vapor phase in the reactor. Adiabatic reactors with prechilled feeds are preferred in which the polymerization exotherm is absorbed by permitting a temperature rise of the polymerizing liquid.

Use of hydrogen to control molecular weight may be avoided or reduced, if desired. The reactor temperature may be used to control the molecular weight of the polymer fraction produced. In series operation, this gives rise to a temperature difference between reactors which is helpful for controlling polymer molecular weight.

Reactor temperature can be selected depending upon the effect of temperature on catalyst deactivation rate and polymer properties and/or extent of monomer depletion. When using more than one reactor, generally temperatures should not exceed the point at which the concentration of catalyst in the second reactor is insufficient to make the desired polymer component in the desired amount. Therefore, reaction temperature can be determined by the details of the catalyst system.

In general, a single reactor or first reactor in a series will operate at a reactor temperature from about 0° C. to about 200° C., or from about 10° C. to about 110° C., or from about 20° C. to about 90° C. Preferably, reaction temperatures are from about 20° C. to about 90° C. or from about 20° C. to about 70° C. When using on or more additional reactors, the additional reactor temperature will vary from about 40° C. to about 200° C., with 50° C. to about 140° C. preferred, and 60° C. to about 120° C. more preferred. Ranges from any of the recited lower limits to any of the recited upper limits are contemplated by the inventors and within the scope of the present description. In copolymerization techniques that utilize one or more bis-CP catalysts with one or more mono-CP catalysts, a lower reaction temperature is preferred for reactions utilizing mono-CP catalyst when compared to the bis-CP catalyst.

Reaction pressure is determined by the details of the catalyst system. In general reactors, whether a single reactor or each of a series of reactors, operates at a reactor pressure of less than 2500 pounds per square inch (psi) (17.23 MPa), or less than 2200 psi (15.16 MPa) or less than 2000 psi (13.78 MPa). Preferably, reactor pressure is from about atmospheric pressure to about 2000 psi (13.78 MPa), or from about 200 psi (1.38 MPa) to about 2000 psi (13.78 MPa), or from about 300 psi (2.07 MPa) to about 1800 psi (12.40 MPa). Ranges from any of the recited lower limits to any of the recited upper limits are contemplated by the inventors and within the scope of the present description.

In the case of less stable catalysts, catalyst can also be fed to a second reactor when the selected process uses reactors in series. Optimal temperatures can be achieved, particularly for series operation with progressively increasing polymerization temperature, by using bis cyclopentadienyl catalyst systems containing hafnium as the transition metal, especially those having a covalent, single atom bridge coupling the two cyclopentadienyl rings.

Particular reactor configurations and processes suitable for use in the processes described herein are described in detail in U.S. Pat. No. 6,319,998 and U.S. Provisional Patent Application having Ser. No. 60/243,192, filed Oct. 25, 2000, which are incorporated by reference herein.

Branching is introduced by the choice of polymerization catalysts or process. The copolymerization process may occur with or without hydrogen present. However, operation without hydrogen is preferred because it inhibits branching in the copolymers since it lead to chain ends which are completely or substantially saturated. Without being limited by theory, it is believed that these saturated polymers cannot participate in the principal branching pathway where pre-formed polymers with unsaturated chain ends are reincorporated into new growing chains which lead to branched polymers.

In alternative embodiments, the first and second ethylene-based copolymers can be polymerized in an alkane solvent, either hexane in a solution process or propylene in a slurry process and finished to remove the solvent. The first and second ethylene-based copolymers can have a medium viscosity and a molecular weight in excess of that needed in the final lubricant formulation. For example, most of the traditional EPDM manufacturing plants cannot "finish" low viscosity polymers having the right viscosity for lubricant formulations. In another example, low viscosity copolymers tend to cold flow upon storage. The second example can be particularly true for amorphous copolymers, which have a lower plateau modulus. The bales are then processed by a series of steps to create the final lubricant composition.

In some embodiments, ethylene and a first comonomer can be polymerized in the presence of a first metallocene catalyst in a first polymerization reaction zone under first polymerization conditions to produce a first effluent comprising a first ethylene-based copolymer. Ethylene and a second comonomer can also be polymerized in the presence of a second metallocene catalyst in a second polymerization reaction zone under second polymerization conditions to produce a second effluent comprising a second ethylene-based copolymer. The resulting discrete copolymers can then be mixed or otherwise blended to provide the rheology modifier.

In one or more embodiments, the first and second polymerization conditions can be independently selected from the group consisting of slurry phase, solution phase and bulk phase. When the first and second polymerization conditions are solution phase, forming the polymeric composition can further include substantial removal of the solvent from the first effluent, the second effluent, or both to produce a solid polymeric composition.

In one or more embodiments, separate polymerizations can be performed in parallel with the effluent polymer solutions from two reactors combined downstream before the finishing. In another embodiment, separate polymerizations may be performed in series, where the effluent of one reactor is fed to the next reactor. In still another embodiment, the separate polymerization may be performed in the same reactor, preferably in sequential polymerizations.

The ethylene-based copolymers can be polymerized by a metallocene catalyst, to form the first ethylene-based copolymer in one reactor and the second ethylene-based copolymer in another reactor. The first and second ethylene-based copolymers can be combined and then subjected to finishing steps to produce the polymeric composition. The first ethylene-based copolymer can be made first; alternatively, the second ethylene-based copolymer can be made first in a series reactor configuration or both ethylene-based copolymers can be made simultaneously in a parallel reactor configuration.

The metallocene catalysts, and their use with non-coordinating ions and non-ionic activators used in the polymerization process can be as discussed and described in U.S. Provisional Patent Application having Ser. No. 61/173,528, entitled "Ethylene-Based Copolymers and Lubricating Oil Compositions Containing the Same," filed on Apr. 28, 2009, which is incorporated by reference herein.

Examples of suitable bis-cyclopentadienyl metallocenes, include, but are not limited to the type disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, which are incorporated by reference herein.

Lubrication Oil Composition

Lubricating oil compositions containing the polymeric composition and one or more base oils are also provided. The base oil can be or include natural or synthetic oils of lubricating viscosity, whether derived from hydrocracking, hydrogenation, other refining processes, unrefined processes, or re-refined processes. The base oil can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In one embodiment, the base oil is or includes a polyalphaolefin (PAO) including a PAO-2, PAO-4, PAO-5, PAO-6, PAO-7 or PAO-8 (the numerical value relating to Kinematic Viscosity at 100° C.). Preferably, the polyalphaolefin is prepared from dodecene and/or decene. Generally, the polyalphaolefin suitable as an oil of lubricating viscosity has a viscosity less than that of a PAO-20 or PAO-30 oil. In one or more embodiments, the base oil can be defined as specified in the American Petroleum Institute (API) Base Oil Interchangeability Guidelines. For example, the base oil can be or include an API Group I, II, III, IV, V oil or mixtures thereof.

In one or more embodiments, the base oil can include oil or blends thereof conventionally employed as crankcase lubricating oils. For example, suitable base oils can include crankcase lubricating oils for spark-ignited and compression-ignited internal combustion engines, such as automobile and truck engines, marine and railroad diesel engines, and the like. Suitable base oils can also include those oils conventionally employed in and/or adapted for use as power transmitting fluids such as automatic transmission fluids, tractor fluids, universal tractor fluids and hydraulic fluids, heavy duty hydraulic fluids, power steering fluids and the like. Suitable base oils can also be or include gear lubricants, industrial oils, pump oils and other lubricating oils.

In one or more embodiments, the base oil can include not only hydrocarbon oils derived from petroleum, but also include synthetic lubricating oils such as esters of dibasic acids; complex esters made by esterification of monobasic acids, polyglycols, dibasic acids and alcohols; polyolefin oils; etc. Thus, the lubricating oil compositions described can be suitably incorporated into synthetic base oils such as alkyl esters of dicarboxylic acids, polyglycols and alcohols; poly-alpha-olefins; polybutenes; alkyl benzenes; organic esters of phosphoric acids; polysilicone oils; etc. The lubricating oil composition can also be utilized in a concentrate form, such as from 1 wt % to 49 wt % in oil, e.g., mineral lubricating oil, for ease of handling, and may be prepared in this form by carrying out the reaction of the invention in oil as previously described.

The lubrication oil composition can include a base oil and one or more compositionally disperse polymeric compositions and/or one or more crystallinity disperse polymeric compositions, and optionally, a pour point depressant. The lubrication oil composition can have a thickening efficiency greater than 1.5, or greater than 1.7, or greater than 1.9, or greater than 2.2, or greater than 2.4 or greater than 2.6. The lubrication oil composition can have a shear stability index less than 55, or less than 45, or less than 35, or less than 30, or less than 25, or less than 20, or less than 15. The lubrication oil composition can have a complex viscosity at −35° C. of less than 500, or less than 450, or less than 300, or less than 100, or less than 50, or less 20, or less than 10 centistokes (cSt). The lubrication oil composition can have a Mini Rotary Viscometer (MRV) viscosity at −35° C. in a 10 W-50 formulation of less than 60,000 cps according to ASTM 1678. The lubrication oil composition can have any combination of desired properties. For example, the lubrication oil composition can have a thickening efficiencies greater than about 1.5 or greater than about 2.6, a shear stability index of less than 55 or less than 35 or less than 25, a complex viscosity at −35° C. of less than 500 cSt or less than 300 cSt or less than 50 cSt, and/or a Mini Rotary Viscometer (MRV) viscosity at −35° C. in a 10 W-50 formulation of less than about 60,000 cps according to ASTM 1678.

The lubrication oil composition preferably comprises about 2.5 wt %, or about 1.5 wt %, or about 1.0 wt % or about 0.5 wt % of the compositionally disperse and/or crystallinity disperse polymeric composition. In some embodiments, the amount of the polymeric composition in the lubrication oil composition can range from a low of about 0.5 wt %, about 1 wt %, or about 2 wt % to a high of about 2.5 wt %, about 3 wt %, about 5 wt %, or about 10 wt %.

Oil Additives

The lubricating oil composition can optionally contain one or more conventional additives, such as, for example, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative corrosion inhibitors include phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt % of a sulfide of phosphorus for ½ to 15 hours, at a temperature in the range of 66° C. to 316° C. Neutralization of the phosphosulfurized hydrocarbon may be effected in the manner known by those skilled in the art.

Oxidation inhibitors, or antioxidants, reduce the tendency of mineral oils to deteriorate in service, as evidenced by the products of oxidation such as sludge and varnish-like deposits on the metal surfaces, and by viscosity growth. Such oxidation inhibitors include alkaline earth metal salts of alkylphenolthioesters having $C_5$ to $C_{12}$ alkyl side chains, e.g., calcium nonylphenate sulfide, barium octylphenate sulfide, dioctylphenylamine, phenylalphanaphthylamine, phosphosulfurized or sulfurized hydrocarbons, etc. Other oxidation inhibitors or antioxidants useful in this invention include oil-soluble copper compounds, such as described in U.S. Pat. No. 5,068,047.

Friction modifiers serve to impart the proper friction characteristics to lubricating oil compositions such as automatic transmission fluids. Representative examples of suitable friction modifiers are found in U.S. Pat. No. 3,933,659, which discloses fatty acid esters and amides; U.S. Pat. No. 4,176,074, which describes molybdenum complexes of poly-isobutenyl succinic anhydride-amino alkanols; U.S. Pat. No. 4,105,571, which discloses glycerol esters of dimerized fatty acids; U.S. Pat. No. 3,779,928, which discloses alkane phosphonic acid salts; U.S. Pat. No. 3,778,375, which discloses reaction products of a phosphonate with an oleamide; U.S. Pat. No. 3,852,205, which discloses S-carboxyalkylene hydrocarbyl succinimide, S-carboxyalkylene hydrocarbyl succinamic acid and mixtures thereof; U.S. Pat. No. 3,879,306, which discloses N(hydroxyalkyl)alkenyl-succinamic acids or succinimides; U.S. Pat. No. 3,932,290, which discloses reaction products of di-(lower alkyl)phosphites and epoxides; and U.S. Pat. No. 4,028,258, which discloses the alkylene oxide adduct of phosphosulfurized N-(hydroxyalkyl)alkenyl succinimides. Preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines such as tetraethylene pentamine and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants.

Pour point depressants ("ppd"), otherwise known as lube oil flow improvers, lower the temperature at which the fluid will flow or can be poured. Any suitable pour point depressant known in the art can be used. For example, suitable pour point depressants include, but are not limited to, one or more $C_8$ to $C_{18}$ dialkylfumarate vinyl acetate copolymers, polymethyl methacrylates, alkylmethacrylates and wax naphthalene.

Foam control can be provided by any one or more anti-foamants. Suitable anti-foamants include polysiloxanes, such as silicone oils and polydimethyl siloxane.

Anti-wear agents reduce wear of metal parts. Representatives of conventional antiwear agents are zinc dialkyldithiophosphate and zinc diaryldithiophosphate, which also serves as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents.

Compositions when containing these conventional additives are typically blended into the base oil in amounts which are effective to provide their normal attendant function. Thus, typical formulations can include, in amounts by weight, a VI improver (0.01-12%); a corrosion inhibitor (0.01-5%); an oxidation inhibitor (0.01-5%); depressant (0.01-5%); an anti-foaming agent (0.001-3%); an anti-wear agent (0.001-5%); a friction modifier (0.01-5%); a detergent/rust inhibitor (0.01-10%); and a base oil.

When other additives are used, it may be desirable, although not necessary, to prepare additive concentrates comprising concentrated solutions or dispersions of the viscosity index improver (in concentrate amounts hereinabove described), together with one or more of the other additives, such a concentrate denoted an "additive package," whereby several additives can be added simultaneously to the base oil to form a lubricating oil composition. Dissolution of the additive concentrate into the lubricating oil may be facilitated by solvents and by mixing accompanied with mild heating, but this is not essential. The additive-package will typically be formulated to contain the viscosity index improver and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from 2.5 to 90%, preferably from 5 to 75%, and still more preferably from 8 to 50% by weight additives in the appropriate proportions with the remainder being base oil. The final formulations may use typically about 10 wt % of the additive-package with the remainder being base oil.

Compositions when containing these conventional additives can be blended with the base oil in amounts which are effective to provide their normal attendant function. Thus, typical formulations can include, in amounts by weight, a VI improver (from about 0.01% to about 12%); a corrosion inhibitor (from about 0.01% to about 5%); an oxidation inhibitor (from about 0.01% to about 5%); depressant (of from about 0.01% to about 5%); an anti-foaming agent (from about 0.001% to about 3%); an anti-wear agent (from about 0.001% to about 5%); a friction modifier (from about 0.01% to about 5%); a detergent/rust inhibitor (from about 0.01 to about 10%); and a base oil.

When other additives are used, it may be desirable, although not necessary, to prepare additive concentrates that include concentrated solutions or dispersions of the VI improver (in concentrated amounts), together with one or more of the other additives, such a concentrate denoted an "additive package," whereby several additives can be added simultaneously to the base oil to form a lubrication oil composition. Dissolution of the additive concentrate into the lubrication oil can be facilitated by solvents and by mixing accompanied with mild heating, but this is not essential. The additive-package can be formulated to contain the VI improver and optional additional additives in proper amounts to provide the desired concentration in the final formulation when the additive-package is combined with a predetermined amount of base oil.

Blending with Base Oils

Conventional blending methods are described in U.S. Pat. No. 4,464,493, which is incorporated by reference herein. This conventional process requires passing the polymer through an extruder at elevated temperature for degradation of the polymer and circulating hot oil across the die face of the extruder while reducing the degraded polymer to particle size upon issuance from the extruder and into the hot oil. The pelletized, solid polymer compositions of the present invention, as described above, can be added by blending directly with the base oil so as give directly viscosity for the VI improver, so that the complex multi-step process of the prior art is not needed. The solid polymer composition can be dissolved in the base oil without the need for additional shearing and degradation processes.

The polymer compositions will be soluble at room temperature in lube oils at up to 10 percent concentration in order to prepare a viscosity modifier concentrate. Such concentrate, including eventually an additional additive package including the typical additives used in lube oil application as described above, is generally further diluted to the final concentration (usually around 1%) by multi-grade lube oil producers. In this case, the concentrate will be a pourable homogeneous solid free solution.

The polymer compositions preferably have a SSI (determined according to ASTM D97) of from about 10 to about 50.

Specific Embodiments

A preferred polymeric composition includes at least 33 wt % of a first ethylene-based copolymer based on the total weight of the polymeric composition, and preferably 67 wt % or less of a second ethylene-based copolymer based on the total weight of the polymeric composition. In some embodiments, the polymeric composition comprises about 40 wt % of the first ethylene-based copolymer based on the weight of the polymeric composition and about 60 wt % of the second ethylene-based copolymer based on the weight of the polymeric composition. In some embodiments, the amount of the first ethylene-based copolymer in the polymeric composition can be about 35 wt %, about 45 wt %, about 50 wt %, about 55 wt %, about 60 wt %, about 65 wt %, about 70 wt %, about 75 wt %, about 80 wt %, about 85 wt %, or about 90 wt %, based on the combined weight of the first ethylene-based copolymer and the second ethylene-based copolymer. In some embodiments, the amount of the second ethylene-based copolymer in the polymeric composition can be about 10 wt %, about 15 wt %, about 20 wt %, about 25 wt %, about 30 wt %, about 35 wt %, about 40 wt %, about 50 wt %, or about 55 wt %, based on the combined weight of the first ethylene-based copolymer and the second ethylene-based copolymer. In some embodiments, the weight percent of the first ethylene-based copolymer in the polymeric composition is greater than the weight percent of the second ethylene-based copolymer in the polymeric composition.

In embodiments where the first and second ethylene-based copolymers are copolymers of ethylene and propylene, the first and second ethylene-based copolymers can be separated by no less than 22 wt % and preferably no less than 19 wt % ethylene content, based on the combined weight of the first and second ethylene-based copolymers. The less crystalline ethylene-based copolymer can have an ethylene content of less than about 55 wt %, less than about 54 wt %, less than about 53 wt %, or less than about 52 wt %, based on the weight of the less crystalline ethylene-based copolymer. The first and second ethylene-based copolymers can form viscosity modifiers that do not show an adverse effect (or show a reduced adverse effect as compared to viscosity modifiers without the first and second ethylene-based copolymers) on the viscosity due to lowering the temperature from ambient to about −35° C. in solution either in synthetic or petroleum base oils.

While not wishing to be bound by theory, it is believed that the rheology modifiers that are compositionally disperse and/or crystallinity disperse are less prone to the deleterious effects of macroscopic crystallization in a dilute solution, as measured by the change in the rheology of the fluid solution, compared to an equivalent amount of single ethylene-based copolymers of the same average composition as the compositionally disperse blend. It is also believed that these compositionally and/or crystallinity disperse polymers will have lower crystallization on cooling from ambient to sub-ambient temperatures, resulting in better low temperature flow properties in solution as compared to equivalent compositionally uniform polymers of similar molecular weight and TE. These polymeric compositions and their use in lubrication oil compositions with bases oils can be distinguished from other compositionally monodisperse olefin copolymers by physical separation of the compositionally disperse polymer into components as well as by a higher ratio of the melting point by DSC to the heat of fusion than would be observed for a monodisperse polymer of the same average ethylene content, melt viscosity and composition.

Polymer Analyses

The ethylene content as an ethylene weight percent ($C_2$ wt %) for the ethylene-based copolymers were determined according to ASTM D1903.

DSC Measurements of the crystallization temperature, $T_c$, and melting temperature, $T_m$, of the ethylene-based copolymers were measured using a TA Instruments Model 2910 DSC. Typically, 6-10 mg of a polymer was sealed in a pan with a hermetic lid and loaded into the instrument. In a nitrogen environment, the sample was first cooled to −100° C. at 20° C./min. It was then heated to 220° C. at 10° C./min and melting data (first heat) were acquired. This provides information on the melting behavior under as-received conditions, which can be influenced by thermal history as well as sample preparation method. The sample was then equilibrated at 220° C. to erase its thermal history. Crystallization data (first cool) were acquired by cooling the sample from the melt to −100° C. at 10° C./min and equilibrated at −100° C. Finally the sample was heated again to 220° C. at 10° C./min to acquire additional melting data (second heat). The endothermic melting transition (first and second heat) and exothermic crystallization transition (first cool) were analyzed for peak temperature and area under the peak. The term "melting point," as used herein, is the highest peak among principal and secondary melting peaks as determined by DSC during the second melt, discussed above. The thermal output was recorded as the area under the melting peak of the sample, which was typically at a maximum peak at about 30° C. to about 175° C. and occurred between the temperatures of about 0° C. and about 200° C. The thermal output was measured in Joules as a measure of the heat of fusion. The melting point is recorded as the temperature of the greatest heat absorption within the range of melting of the sample.

Molecular weight (weight-average molecular weight, Mw, number-average molecular weight, Mn, and molecular weight distribution, Mw/Mn or MWD) were determined using a High Temperature Size Exclusion Chromatograph (either from Waters Corporation or Polymer Laboratories), equipped with a differential refractive index detector (DRI), an online light scattering (LS) detector, and a viscometer. Experimental details not described below, including how the detectors were calibrated, are described in: T. Sun, P. Brant, R. R. Chance, and W. W. Graessley, MACROMOLECULES, Vol. 34, Number 19, pp. 6812-6820 (2001).

Three Polymer Laboratories PLgel 10 mm Mixed-B columns were used. The nominal flow rate was 0.5 cm$^3$/min, and the nominal injection volume was 300 μL. The various transfer lines, columns and differential refractometer (the DRI detector) were contained in an oven maintained at 145° C. Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 145° C. The injection concentration ranged from about 1.0 mg/ml to about 2.0 mg/ml, with lower concentrations being used for higher molecular weight samples. Prior to running each sample the DRI detector and the injector were purged. Flow rate in the apparatus was then increased to 0.5 ml/minute, and the DRI was allowed to stabilize for about 8 to 9 hours before injecting the first sample. The LS laser was turned on from about 1 hour to about 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the light scattering (LS) analysis. Units on parameters throughout this description of the SEC method are such that concentration is expressed in g/cm$^3$, molecular weight is expressed in g/mole, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient [for purposes of this invention and the claims thereto, $A_2$=0.0006 for propylene polymers and 0.001 otherwise], $P(\theta)$ is the form factor for a monodisperse random coil (M. B. Huglin, LIGHT SCATTERING FROM POLYMER SOLUTIONS, Academic Press, 1971), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 145° C. and $\lambda$=690 nm. For purposes of this invention and the claims thereto (dn/dc)=0.104 for propylene polymers and 0.1 otherwise.

A high temperature Viscotek Corporation viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where, for purpose of this invention and claims thereto, $\alpha$=0.695 for ethylene, propylene, and butene polymers; and k=0.000579 for ethylene polymers, k=0.000228 for propylene polymers, and k=0.000181 for butene polymers. $M_v$ is the viscosity-average molecular weight based on molecular weights determined by LS analysis.

Anton-Parr Low Temperature Solution Rheology (low temperature rheology) experiments were done on an Anton-Parr Model MCR501 rheometer using a 1" cone and plate setup. The cone has a nominal 1 degree angle and 50 micron gap. About 100 microliters of sample is deposited on the bottom plate using a syringe-pipette. The cone is then lowered onto the plate so that the volume between the cone and plate is fully occupied by solution. The temperature is then lowered at a cooling rate of 1.5° C./min. while measuring the complex viscosity at an angular frequency of 0.1 radians/sec., applying a 10% strain and recording a value every minute. The viscosity at 0.1 rad/sec is then plotted as a function of temperature to observe the effect of gelation.

Scanning Brookfield Viscometer

The Scanning Brookfield Viscometer was operated according to ASTM D5133. 25 ml to 30 ml of the sample was poured into a glass stator to the fill line which was immersed into an oil bath. The oil bath was programmed to cool from −5° C. to −40° C. at 1° C./hour scanning speed. The sample was preheated to 90° C. for 90 minutes to remove thermal history. The temperature ramping program was set to cool from −5° C. to −40° C. at 1° C./hour scanning speed. In sample collection mode, the Gelation Index (GI) and maximum viscosity can be viewed. The torque versus temperature data set can be converted to a viscosity-temperature plot at which a gelation point and/or corresponding gelation index can be established.

Melt Index (MI) was measured according to ASTM D1238 at 190° C. under a 2.16 kilogram load.

Melt Flow Rate (MFR) was measured according to ASTM D1238 at 230° C. under a 2.16 kilogram load or a 21.6 kilogram load.

Thickening Efficiency (TE) was determined according to ASTM D445.

Shear Stability index (SSI) was determined according to ASTM D6278 at 30 and 90 passes using a Kurt Ohban machine.

Shear stress data was accomplished by first heating the sample to −15° C., and waiting for 15 minutes. Then while measuring the shear stress, applying a logarithmically increasing strain by varying the shear rate logarithmically from $10^{-3}$ to 10 with 20 points/decade and 1 second per point.

The number of branch points was determined by measuring the radius of gyration of polymers as a function of the molecular weight by the methods of size exclusion chromatography augmented by laser light scattering. These procedures are described in the publications "A Study of the Separation Principle in Size Exclusion Chromatography" by T. Sun, R. R. Chance, W. W. Graessley and D. J. Lohse in the journal MACROMOLECULES, 2004, Vol. 37, Issue 11, pp. 4304-4312, and "Effect of Short Chain Branching on the Coil Dimensions of Polyolefins in Dilute Solution" by T. Sun, R. R. Chance, W. W. Graessley and P. Brant in the journal MACROMOLECULES, 2001, Vol. 34, Issue 19, pp. 6812-6820, which are incorporated by reference herein.

Branching in polymers having narrow, and most probably, low polydispersity index with essentially uniform intramolecular and intermolecular distribution of composition can also be described by the ratio of the TE to the MFR@230° C. measured at a load of 2.16 kg. High values of this parameter indicate low levels of branching while low levels indicate substantial levels of branching.

Intermolecular composition distribution, unlike CDBI, contemplates weight percent of copolymer content within a smaller range from a median total molar comonomer content, e.g., within 25 wt % of median. For example, for a Gaussian compositional distribution, 95.5% of the polymer, used herein for this example as "Polymer Fraction", is within 20 wt % ethylene of the mean if the standard deviation is 10%. The intermolecular composition distribution for the Polymer Fraction is 20 wt % ethylene for such a sample, i.e., 10% standard deviation yields 20 wt % intermolecular composition distribution.

Compositional Heterogeneity, both intermolecular-CD and intramolecular-CD can be determined by carbon-13 NMR. Conventional techniques for measuring intermolecular-CD and intramolecular-CD are described in MACROMOLECULES, H. N. Cheng, Masahiro Kakugo, entitled "Carbon-13 NMR analysis of compositional heterogeneity in ethylene-propylene copolymers," Vol. 24, Issue 8, pp. 1724-1726, (1991), and in the publication MACROMOLECULES, C. Cozewith, entitled "Interpretation of carbon-13 NMR sequence distribution for ethylene-propylene copolymers made with heterogeneous catalysts," Vol. 20, Issue 6, pp. 1237-1244 (1987).

Generally, conventional carbon-13 NMR measurements of diad and triad distribution are used to characterize the ethylene-based copolymer. Any conventional technique for measuring carbon-13 NMR may be utilized. For example, ethylene-based copolymer samples are dissolved in a solvent, e.g., trichlorobenzene at 4.5 wt % concentration. The carbon-13 NMR spectra are obtained at elevated temperature, e.g., 140° C., on a NMR spectrometer at 100 MHz. An exemplary spectrometer is a pulsed Fourier transform Varian XL-400 NMR spectrometer. Deuteriated o-dichlorobenezene is placed in a coaxial tube to maintain an internal lock signal. The following instrument conditions are utilized: pulse angle, 75°; pulse delay, 25 second; acquisition time, 0.5 second, sweep width, 16000 Hz. The carbon-13 NMR peak area measurements were determined by spectral integration. Diad and triad concentrations were calculated from the equations presented in MACROMOLECULES, Kakugo et al., Vol. 15, Issue 4, pp. 1150-1152 (1982). The diad and triad concentrations were then normalized to give a mole fraction distribution. Polymer composition was calculated from the methane peaks, the methylene peaks, and the diad balance. These values may be considered individually or an average of the three values may be utilized. Unless stated otherwise, this application utilizes an average of these three values. The results are then compared to conventional model equations as disclosed in the above references.

One aspect of these measurements involves the determination of the reactivity ratios ($r_1 r_2$) of the polymerization system for the ethylene-based polymers according to the procedures in the publication. Polymers which have a compositional heterogeneity, either intramolecular or intermolecular, have a much larger reactivity ratio than the polymers which have only a small or negligible amount.

Without being limited to theory or one method of calculation, it is believed that an one exemplary model for, so called ideal copolymerizations, is described by the terminal copolymerization model:

$$m = M(r_1 M + 1)/(r_2 + M) \quad (1)$$

wherein $r_1$ and $r_2$ are the reactivity ratios, m is the ratio of monomers in the copolymer, $m_1/m_2$, M is the ratio of monomers in the reactor, $M_1/M_2$, and the diad and triad concentrations follow first order Markov statistics. For this model, nine equations are derived that related to the diad and triad concentrations $P_{12}$ and $P_{21}$, the probability of propylene adding to an ethylene-ended chain, and the probability of propylene adding to a propylene-ended chain, respectively. Thus a fit of carbon-13 NMR data to these equations yields $P_{12}$ and $P_{21}$ as the model parameters from which $r_1$ and $r_2$ can be obtained from the relationships:

$$r_1 M = (1 - P_{12})/P_{12}$$

$$r_2/M = (1 - P_{21})/P_{21}$$

The corresponding equations for random copolymerizations with $r_1 r_2 = 1$ can also be used to simplify equation (1), above, to $m = r_1 M$. The ethylene fraction in the polymer, E, is equal to $1 - P_{12}$. This allows the diad and triad equations to be written in terms of polymer composition:

$$EE = E^2$$

$$EE = 2E(1-E)$$

$$PP = (1-E)$$

$$EEE = E^3$$

$$EEP = 2E^2(1-E)$$

$$EPE = E^2(1-E)$$

$$PEP = E(1-E)^2$$

$$PPE = 2E(1-E)^2$$

$$PPP = (1-E)^3$$

Variations and extensions of these equations are provided in the references incorporated herein, including use of catalysts with different active sites, equations for estimating the number of catalyst species present, or complex models such as those with three or more species present, etc.

From these modeling equations, and those equations presented by MACROMOLECULES, C. Cozewith, Ver Strate, Vol. 4, pp. 482-489 (1971), the average values of $\bar{r}_1$, $\bar{r}_2$, and $\overline{r_1 r_2}$ arising from the copolymerization kinetics are given by:

$$\bar{r}_1 = (\Sigma r_{1i} f_i / G_i)/(\Sigma f_i / G_i)$$

$$\bar{r}_2 = (\Sigma r_{2i} f_{2i} / G_i)/(\Sigma f_i / G_i)$$

$$\overline{r_1 r_2} = (\Sigma r_{1i} f_i / G_i)(\Sigma r_{2i} f_i / G_i)/(\Sigma f_i / G_i)^2$$

where $G_i = r_{1i} M \pm 2 + r_{2i}/M$

These equations and the models presented in the references cited above may be utilized by those skilled in the art to characterize the ethylene-based copolymer composition distribution.

Further information and techniques for measuring intramolecular-CD are found in MACROMOLECULES, Randel, James C., Vol. 11, Issue 1, pp. 33-36 (1978), MACROMOLECULES, Cheng, H. N., Vol. 17, Issue 10, pp. 1950-1955 (1984), and MACROMOLECULES, Ray, G. Joseph, Johnson, Paul E., and Knox, Jack R., Vol. 10, Issue 4, pp. 773-778 (1977), which are incorporated by reference herein. Such techniques are readily known to those skilled in the art of analyzing and characterizing olefin polymers.

Temperature Rising Elution Fractionation (TREF). The determination of intermolecular compositional heterogeneity was determined by the fractionation of the EP copolymer carried out by a Polymer Char TREF 200 based on a well-known principle that the solubility of a semi-crystalline copolymer is a strong function of temperature. A corresponding method is described in U.S. Pat. No. 5,008,204. The instrument is a column packed with solid stainless-steel beads. The copolymer of interest was dissolved in 1,2 ortho-dichlorobenzene (oDCB) at 160° C. for 60 min. Half of a milliliter (ml) of the polymer solution (concentration=4-5 mg/ml) was injected in the column and it was stabilized there at 140° C. for 45 min. The solution was cooled from 140° C. to −15° C. at 1° C./min and equilibrated at this temperature for 10 min. This caused the copolymer to crystallize out of the quiescent solution in successive layers of decreasing crystallinity onto the surface of the beads. Pure solvent (oDCB) was pumped for 5 min at −15° C. at a flow rate of 1 ml/min through an infrared detector. A valve was then switched to allow this chilled oDCB to flow through the column at the same flow rate at −15° C. for 10 min. The material eluted was designated as the soluble fraction of the copolymer. At this point, the heater was on and the solvent continued to flow through both the column and the infrared detector while the temperature was programmed upward at a controlled rate of 2° C./min to 140° C. The infrared detector continuously measured the concentration of the copolymer in the effluent from the column, and a continuous solubility distribution curve was obtained.

In a specific embodiments, the first ethylene-based copolymer can be present in the polymeric composition in an amount of at least 33 wt %, based on the combined weight of the first and second ethylene-based copolymers, can have a crystallinity of less than 15 J/g or more preferably less than 10 J/g, and can have a composition with an ethylene content of less than 55 wt %, or less than 54 wt %, or less than 53 wt %, or less than 52 wt %, or less than 51 wt %, based on the weight of the first ethylene-based copolymer.

Additional specific embodiments of the invention can include:

Embodiment 1

A polymeric composition comprising: (a) a first ethylene-based copolymer having: (i) an intermolecular composition distribution of greater than or equal to 50, 40, 30, 20, 10 or 5 wt % and (ii) a substantially linear structure; and (b) a second ethylene-based copolymer having: (i) an intermolecular composition distribution of less than or equal to 50, 40, 30, 20, 10 or 5 wt % and (ii) a substantially linear structure.

Embodiment 2

A polymeric composition for lubrication fluids comprising: (a) a first ethylene-based copolymer having: (i) an intermolecular composition distribution of greater than or equal to 50, 40, 30, 20, 10 or 5 wt % and (ii) a substantially linear structure; and (b) a second ethylene-based copolymer having: (i) an intramolecular composition distribution of less than or equal to 50, 40, 30, 20, 10 or 5 wt % and (ii) a substantially linear structure.

Embodiment 3

A polymeric composition comprising: (a) a first ethylene-based copolymer having: (i) an intramolecular composition distribution of greater than or equal to 50, 40, 30, 20, 10 or 5 wt %, and (ii) a substantially linear structure; and (b) a second ethylene-based copolymer having: (i) an intermolecular composition distribution of less than or equal to 50, 40, 30, 20, 10 or 5 wt % and (ii) a substantially linear structure.

Embodiment 4

A polymeric composition comprising: (a) a first ethylene-based copolymer having: (i) an intramolecular composition distribution of greater than or equal to 50, 40, 30, 20, 10, or 5 wt %, and (ii) a substantially linear structure; and (b) a second ethylene-based copolymer having: (i) an intramolecular composition distribution of less than or equal to 50, 40, 30, 20, 10 or 5 wt % and (ii) a substantially linear structure.

Embodiment 5

The polymeric composition of embodiments 1 to 4, where the ethylene content of the first ethylene-based copolymer ($E_A$) or the ethylene content of the second ethylene-based copolymer ($E_B$) is in the range from greater than or equal to 35 to less than or equal to 85 based on the weight of the polymeric composition.

Embodiment 6

The polymeric composition of embodiments 1 to 4, where the absolute value of the difference between $E_B$ and $E_A$ is greater than or equal to 5 wt %.

Embodiment 7

The polymeric composition of embodiments 1 to 4, where the first ethylene-based copolymer and/or the second ethylene-based copolymers each comprises ethylene and a comonomer. The comonomer can be independently selected from the group consisting of alpha-olefins and mixtures thereof. The alpha-olefins can be independently selected from the group consisting of a $C_3$ to $C_{20}$ alpha-olefins and mixtures thereof. The alpha-olefins can be propylene, butene, hexene, octene, or any combination thereof.

Embodiment 8

The polymeric composition of embodiments 1 to 4, where the comonomer of the first and/or the second ethylene-based copolymers further comprises a polyene monomer, and the polymeric composition further comprises up to 5 mol % polyene-derived units.

Embodiment 9

A lubrication oil composition comprising: (a) a base oil and (b) any one the embodiments 1 to 4 of the polymeric composition. The lubrication oil composition having a physical property selected from the group consisting of: (i) a TE of greater than or equal to 1.5; (ii) a SSI of less than 55; and (iii) a complex viscosity at −31° C. of less than or equal to 500 cSt.

Described below are further embodiments of the inventions provided herein:

A. A polymeric composition, comprising:
a first ethylene-based copolymer having a weight percent of ethylene-derived units based on a weight of the polymeric composition ($E_A$) ranging from about 35 wt % to about 52 wt % and a weight-average molecular weight ($Mw_A$) of less than or equal to 130,000; and
a second ethylene-based copolymer having a weight percent of ethylene-derived units based on the weight of the polymeric composition ($E_B$) ranging from about 65 wt % to about 85 wt % and a weight-average molecular weight ($Mw_B$) of less than 130,000.

B. The polymeric composition of embodiment A, wherein at least one of the first ethylene-based copolymer and the second ethylene-based copolymer has a substantially linear structure.

C. The polymeric composition of embodiments A or B, wherein the first ethylene-based copolymer is present in an amount of at least 33 wt %, based on the combined weight of the first and second ethylene-based copolymers.

D. The polymeric composition according to any one of embodiments A-C, wherein the first ethylene-based copolymer has a heat of fusion on a first melt of the first ethylene-based copolymer ($H_A$) of less than 10 J/g.

E. The polymeric composition according to any one of embodiments A-D, wherein the first ethylene-based copolymer has an ethylene content of less than about 50 wt %, based on the weight of the first ethylene-based copolymer.

F. The polymeric composition according to any one of embodiments A-E, wherein at least one of the first ethylene-based copolymer and the second ethylene-based copolymer has a molecular weight distribution (MWD) of about 2.4 or less.

G. The polymeric composition according to any one of embodiments A-F, wherein at least one of the molecular weight distribution (MWD) of the first ethylene-based copolymer and the molecular weight distribution (MWD) of the second ethylene-based copolymer is in the range from greater than or equal to 1.80 to less than or equal to 1.95.

H. The polymeric composition according to any one of embodiments A-G, wherein the weight percent of ethylene-derived units of the first ethylene-based copolymer ($E_A$) is less than the weight percent of ethylene-derived units of the second ethylene-based copolymer ($E_B$).

I. The polymeric composition according to any one of embodiments A-H, wherein a difference between the weight percent of ethylene-derived units of the second ethylene-based copolymer ($E_B$) and weight percent of ethylene-derived units of the first ethylene-based copolymer ($E_A$) is greater than or equal to 5.

J. The polymeric composition according to any one of embodiments A-I, wherein a ratio of a melt index of the first ethylene-based copolymer ($MI_A$) to a melt index of the second ethylene-based copolymer ($MI_B$) is less than or equal to 3.0.

K. The polymeric composition according to any one of embodiments A-J, wherein the weight percent of the first ethylene-based copolymer in the polymeric composition is less than the weight percent of the second ethylene-based copolymer in the polymeric composition, based on the combined weight of the first and second copolymers.

L. The polymeric composition according to any one of embodiments A-K, wherein the weight-average molecular weight of the first ethylene-based copolymer ($Mw_A$) ranges from about 60,000 to about 130,000.

M. The polymeric composition according to any one of embodiments A-L, wherein the weight-average molecular weight of the second ethylene-based copolymer ($Mw_B$) ranges from about 60,000 to about 130,000.

N. The polymeric composition according to any one of embodiments A-M, wherein at least one of the first ethylene-based copolymer and the second ethylene-based copolymer comprise ethylene and a comonomer selected from the group consisting of propylene, butene, hexene, octene, and mixtures thereof.

O. The polymeric composition according to any one of embodiments A-N, wherein at least one of the first ethylene-based copolymer and the second ethylene-based copolymer comprise ethylene and a comonomer selected from the group consisting of propylene, butene, hexene, octene, and mixtures thereof, and wherein the comonomer of at least one of the first ethylene-based copolymer and the second ethylene-based copolymer further comprises a polyene monomer, and the polymeric composition further comprises up to 5 mol % polyene-derived units.

P. The polymeric composition according to any one of embodiments A-O, wherein a weight percent of the first ethylene-based copolymer is less than or equal to 66 wt % of the total weight of the first ethylene-based copolymer and the second ethylene-based copolymer.

Q. The polymeric composition according to any one of embodiments A-P, wherein ethylene-derived units in the total amount of the first ethylene-based copolymer and the second ethylene-based copolymer ranges from about 70 mol % to about 85 mol %.

R. The polymeric composition according to any one of embodiments A-Q, wherein a heat of fusion on a first melt of the first ethylene-based copolymer ($H_A$) is less than a heat of fusion on a first melt of the second ethylene-based copolymer ($H_B$).

S. The polymeric composition according to any one of embodiments A-R, wherein a heat of fusion on the first melt of the first ethylene-based copolymer ($H_A$) ranges from about 0 J/g to about 10 J/g.

T. A lubrication oil composition comprising a base oil; and the polymeric composition according to any one of embodiments A-S.

U. The lubrication oil composition of embodiment T having at least one of: a TE of greater than or equal to 1.5; a SSI of less than 55; a complex viscosity at −31° C. of less than or equal to 500 cSt; and a Mini Rotary Viscometer (MRV) viscosity at −35° C. in a 10 W-50 formulation of less than 60,000 cps according to ASTM 1678.

V. A polymeric composition, comprising:
a first ethylene-based copolymer having a heat of fusion on a first melt of the first ethylene-based copolymer ($H_A$) ranging from about 0 J/g to about 15 J/g and a weight-average molecular weight ($Mw_A$) of less than 130,000; and
a second ethylene-based copolymer having a heat of fusion on a first melt of the second ethylene-based copolymer ($H_B$) ranging from about 30 J/g to about 60 J/g and a weight-average molecular weight ($Mw_B$) of less than or equal to 130,000.

W. The polymeric composition of embodiment V, wherein the heat of fusion on the first melt of the first ethylene-based copolymer ($H_A$) ranges from about 0 J/g to about 10 J/g.

X. The polymeric composition of embodiments V or W, wherein at least one of the first ethylene-based copolymer and the second ethylene-based copolymer has a substantially linear structure.

Y. The polymeric composition according to any one of embodiments V-X, wherein at least one of the first ethylene-based copolymer and the second ethylene-based copolymer has a molecular weight distribution (MWD) of about 2.4 or less.

Z. The polymeric composition according to any one of embodiments V-Y, wherein at least one of the molecular weight distribution (MWD) of the first ethylene-based copolymer and the molecular weight distribution (MWD) of the second ethylene-based copolymer is in the range from greater than or equal to 1.80 to less than or equal to 1.95.

AA. The polymeric composition according to any one of embodiments V-Z, wherein a weight percent of the first ethylene-based copolymer is greater than the weight percent of the second ethylene-based copolymer.

BB. The polymeric composition according to any one of embodiments V-AA, wherein the weight-average molecular weight of the first ethylene-based copolymer ($Mw_A$) ranges from about 60,000 to about 130,000.

CC. The polymeric composition according to any one of embodiments V-BB, wherein the weight-average molecular weight of the second ethylene-based copolymer ($Mw_B$) ranges from about 60,000 to about 130,000.

DD. The polymeric composition according to any one of embodiments V-CC, wherein at least one of the first ethylene-based copolymer and the second ethylene-based copolymer comprise ethylene and a comonomer selected from the group consisting of propylene, butene, hexene, octene, and mixtures thereof.

EE. The polymeric composition according to any one of embodiments V-DD, wherein at least one of the first ethylene-based copolymer and the second ethylene-based copolymer comprise ethylene and a comonomer selected from the group consisting of propylene, butene, hexene, octene, and mixtures thereof, and wherein the comonomer of at least one of the first ethylene-based copolymer and the second ethylene-based copolymer further comprises a polyene monomer, and the polymeric composition further comprises up to 5 mol % polyene-derived units.

FF. The polymeric composition according to any one of embodiments V-EE, wherein a ratio of a melt index of the first ethylene-based copolymer ($MI_A$) to a melt index of the second ethylene-based copolymer ($MI_B$) is less than or equal to 3.0.

GG. The polymeric composition according to any one of embodiments V-FF, wherein a weight percent of the first ethylene-based copolymer is less than about 66 wt % of the total weight of the first ethylene-based copolymer and the second ethylene-based copolymer.

HH. The polymeric composition according to any one of embodiments V-GG, wherein the first ethylene-based copolymer is present in an amount of at least 33 wt % based on the combined weight of the first ethylene-based copolymer and the second ethylene-based copolymer.

II. The polymeric composition according to any one of embodiments V-HH, wherein the first ethylene-based copolymer has an ethylene content of less than 55 wt % based on the total weight of the first ethylene-based copolymer.

JJ. The polymeric composition according to any one of embodiments V-II, wherein the first ethylene-based copolymer has an ethylene content of less than 53 wt % based on the total weight of the first ethylene-based copolymer.

KK. The polymeric composition according to any one of embodiments V-JJ, wherein ethylene-derived units in the total amount of the first ethylene-based copolymer and the second ethylene-based copolymer ranges from about 70 mol % to about 85 mol %.

LL. A lubrication oil composition comprising a base oil; and the polymeric composition according to any one of embodiments V-KK.

MM. The lubrication oil composition of embodiment LL having at least one of: a TE of greater than or equal to 1.5; a SSI of less than 55; a complex viscosity at −31° C. of less than or equal to 500 cSt; and a Mini Rotary Viscometer (MRV) viscosity at −35° C. in a 10 W-50 formulation of less than 60,000 cps according to ASTM 1678.

NN. A method for making a composition of any of embodiments A-MM comprising combining the first copolymer and the second copolymer recited therein, and forming the composition.

EXAMPLES

The foregoing discussion can be further described with reference to the following non-limiting examples.

Example 1

Preparation of the Ethylene Propylene Copolymer of Example 1

All polymer compositions in Example 1 were synthesized in one continuous stirred tank reactors. The polymerization was performed in solution, using hexane as a solvent. In the reactor, polymerization was performed at a temperature of 110° C. to 115° C., an overall pressure of 20 bar and ethylene and propylene feed rates of 1.3 kg/hr and 2 kg/hr, respectively. As catalyst, N,N-dimethylanilinium tetrakis(pentafluorophenyl)boron was used to activate di(p-triethylsilylphenyl)methenyl[(cyclopentadienyl)(2,7-di-tert-butylfluorenyl)]hafnium dimethyl. In the process, hydrogen addition and temperature control were used to achieve the desired MFR. The catalyst, activated externally to the reactor, was added as needed in amounts effective to maintain the target polymerization temperature.

The copolymer solution emerging from the reactor was stopped from further polymerization by addition of water and then devolatilized using conventionally known devolatilization methods such as flashing or liquid phase separation, first by removing the bulk of the hexane to provide a concentrated solution, and then by stripping the remainder of the solvent in anhydrous conditions using a devolatilizer or a twin screw devolatilizing extruder so as to end up with a molten polymer composition containing less than 0.5 wt % of solvent and other volatiles. The molten polymer was cooled until solid.

Table 1 shows various properties of the ethylene-based copolymers of Example 1.

TABLE 1

| ID | $M_W$ (g/mol) | Mw/Mn | EPR Polymer Wt % C2 | MRF 2.16 kg 230° C. | MFR 21.6 kg 230° C. | $1^{st}$ Melt Tm, ° C. | $1^{st}$ Melt Hf, J/g | $2^{nd}$ Cool Tc, ° C. | $2^{nd}$ Cool Hc, J/g | $2^{nd}$ Melt Tm, ° C. | $2^{nd}$ Melt Hf, J/g |
|---|---|---|---|---|---|---|---|---|---|---|---|
| PR01 | 82000 | 1.84 | 63.6 | 9.2 | 175 | 3.2 | 26 | −2 | 29 | −2.5 | 27 |
| PR02 | 71000 | 1.85 | 70.5 | 13 | 238 | 24, 46 | 38 | 14 | 41 | 31 | 33 |
| PR03 | 97,000 | 1.95 | 74.4 | 15 | 280 | −13 | 21 | −16 | 21 | −14 | 17 |
| PR04 | 80,000 | 1.93 | 71.8 | 12 | 239 | 23, 44 | 41 | 13 | 43 | 27 | 41 |
| PR05 | 89,000 | 2.07 | 71.8 | 12 | 259 | −3 | 28 | −5.7 | 22 | −4.3 | 23 |
| PR06 | 99,000 | 2 | 71.9 | 15 | 277 | 21, 48 | 54 | 18, 26 | 49 | 37 | 48 |
| PR07 | 103,000 | 2.07 | 70.9 | 8 | 184 | −15 | 18 | −18 | 20 | −17 | 21 |
| PR08 | 110,000 | 2.04 | 68.2 | 7.9 | 159 | −9.4 | 21 | −13 | 23 | −11 | 25 |
| PR09 | 95,000 | 2.14 | 64.1 | 4.9 | 155 | | | | | | |
| PR10 | 109,000 | 1.91 | 60.6 | 12 | 377 | | | | | | |
| PR11 | 98,000 | 1.85 | 54 | 12 | 288 | | | | | | |
| PR12 | 108,000 | 1.98 | 51.5 | | | | | | | | |

Table 2 shows the blending of the PR polymers to form test additive polymers.

TABLE 2

| Sample | PR01 | PR02 | PR03 | PR04 | PR05 | PR06 | PR07 | PR08 | PR09 | PR10 | PR11 | PR12 |
|---|---|---|---|---|---|---|---|---|---|---|---|---|
| 1 |  |  | 280 | 120 |  |  |  |  |  |  |  |  |
| 2 |  | 120 | 280 |  |  |  |  |  |  |  |  |  |
| 3 |  |  | 280 |  |  | 120 |  |  |  |  |  |  |
| 4 | 320 |  |  | 80 |  |  |  |  |  |  |  |  |
| 5 | 280 |  |  | 120 |  |  |  |  |  |  |  |  |
| 6 | 240 |  |  | 160 |  |  |  |  |  |  |  |  |
| 7 | 320 | 80 |  |  |  |  |  |  |  |  |  |  |
| 8 | 280 | 120 |  |  |  |  |  |  |  |  |  |  |
| 9 | 240 | 160 |  |  |  |  |  |  |  |  |  |  |
| 10 | 320 |  |  |  |  |  | 80 |  |  |  |  |  |
| 11 | 280 |  |  |  |  |  | 120 |  |  |  |  |  |
| 12 | 240 |  |  |  |  |  | 160 |  |  |  |  |  |
| 13 |  |  |  | 120 | 280 |  |  |  |  |  |  |  |
| 14 |  | 120 |  |  | 280 |  |  |  |  |  |  |  |
| 15 |  |  |  |  | 280 | 120 |  |  |  |  |  |  |
| 16 |  |  |  | 120 |  |  |  |  | 280 |  |  |  |
| 17 |  | 120 |  |  |  |  |  |  | 280 |  |  |  |
| 18 |  |  |  |  |  | 120 |  |  | 280 |  |  |  |
| 19 |  |  |  | 80 |  |  | 320 |  |  |  |  |  |
| 20 |  |  |  | 120 |  |  | 280 |  |  |  |  |  |
| 21 |  |  |  | 120 |  |  | 280 |  |  |  |  |  |
| 22 |  | 80 |  |  |  |  | 320 |  |  |  |  |  |
| 23 |  | 120 |  |  |  |  | 280 |  |  |  |  |  |
| 24 |  | 160 |  |  |  |  | 240 |  |  |  |  |  |
| 25 |  |  |  |  |  | 80 | 320 |  |  |  |  |  |
| 26 |  |  |  |  |  | 120 | 280 |  |  |  |  |  |
| 27 |  |  |  |  |  | 160 | 240 |  |  |  |  |  |
| 28 |  |  |  | 120 |  |  |  |  | 280 |  |  |  |
| 29 |  | 120 |  |  |  |  |  |  | 280 |  |  |  |
| 30 |  |  |  |  |  | 120 |  |  | 280 |  |  |  |
| 31 |  |  |  | 120 |  |  |  |  |  | 280 |  |  |
| 32 |  | 120 |  |  |  |  |  |  |  | 280 |  |  |
| 33 |  |  |  |  |  | 120 |  |  |  | 280 |  |  |
| 34 |  |  |  | 120 |  |  |  |  |  |  | 280 |  |
| 35 |  | 120 |  |  |  |  |  |  |  |  | 280 |  |
| 36 |  |  |  |  |  | 120 |  |  |  |  | 280 |  |
| 37 |  |  |  | 120 |  |  |  |  |  |  |  | 280 |
| 38 |  | 120 |  |  |  |  |  |  |  |  |  | 280 |
| 39 |  |  |  |  |  | 120 |  |  |  |  |  | 280 |
| 40 |  |  |  | 80 |  |  |  |  |  |  |  | 320 |
| 41 |  | 80 |  |  |  |  |  |  |  |  |  | 320 |
| 42 |  |  |  |  |  | 80 |  |  |  |  |  | 320 |
| 43 |  |  |  | 80 |  |  |  |  |  | 320 |  |  |
| 44 |  | 80 |  |  |  |  |  |  |  | 320 |  |  |
| 45 |  |  |  |  |  | 80 |  |  |  | 320 |  |  |
| 46 |  |  |  | 160 |  |  |  |  |  |  |  | 240 |
| 47 |  | 160 |  |  |  |  |  |  |  |  |  | 240 |
| 48 |  |  |  |  |  | 160 |  |  |  |  |  | 240 |
| 49 |  |  |  | 160 |  |  |  |  |  | 240 |  |  |
| 50 |  | 160 |  |  |  |  |  |  |  | 240 |  |  |
| 51 |  |  |  |  |  | 160 |  |  |  | 240 |  |  |
| 52 |  | 200 |  |  |  |  |  |  |  | 200 |  |  |
| 53 |  | 200 |  |  |  |  |  |  | 200 |  |  |  |
| 54 |  | 200 |  |  |  |  |  |  |  |  | 200 |  |
| 55 |  | 200 |  |  |  |  |  |  |  |  |  | 200 |
| 56 |  |  |  | 200 |  |  |  |  |  | 200 |  |  |
| 57 |  |  |  | 200 |  |  |  |  | 200 |  |  |  |
| 58 |  |  |  | 200 |  |  |  |  |  |  | 200 |  |
| 59 |  |  |  | 200 |  |  |  |  |  |  |  | 200 |
| 60 |  |  |  |  |  | 200 |  |  |  | 200 |  |  |
| 61 |  |  |  |  |  | 200 |  |  | 200 |  |  |  |
| 62 |  |  |  |  |  | 200 |  |  |  |  | 200 |  |
| 63 |  |  |  |  |  | 200 |  |  |  |  |  | 200 |
| 63 |  |  |  |  |  | 200 |  |  |  |  |  | 200 |
| 64 |  |  |  | 240 |  |  |  |  |  | 160 |  |  |
| 65 |  |  |  | 240 |  |  |  |  |  |  | 160 |  |
| 66 |  |  |  | 240 |  |  |  |  |  |  |  | 160 |
| 67 |  |  |  | 240 |  |  |  |  |  |  |  | 160 |
| 68 |  | 240 |  |  |  |  |  |  |  | 160 |  |  |
| 69 |  | 240 |  |  |  |  |  |  |  |  | 160 |  |
| 70 |  | 240 |  |  |  |  |  |  |  |  |  | 160 |
| 71 |  | 240 |  |  |  |  |  |  |  |  |  | 160 |
| 72 |  |  |  |  |  | 240 |  |  |  | 160 |  |  |
| 73 |  |  |  |  |  | 240 |  |  |  |  | 160 |  |
| 74 |  |  |  |  |  | 240 |  |  |  |  |  | 160 |

TABLE 2-continued

| Sample | PR01 | PR02 | PR03 | PR04 | PR05 | PR06 | PR07 | PR08 | PR09 | PR10 | PR11 | PR12 |
|---|---|---|---|---|---|---|---|---|---|---|---|---|
| 75 | | | | | | 240 | | | | | | 160 |
| 76 | | | | 160 | | | | | | 240 | | |
| 77 | | 160 | | | | | | | | 240 | | |
| 78 | | | | | | 160 | | | | 240 | | |
| 79 | | | | 160 | | | | 240 | | | | |
| 80 | 160 | | | | | | | 240 | | | | |
| 81 | | | | | | 160 | | 240 | | | | |

Table 3 shows the characterization data for selected lube oil additive polymers of Table 2. These disperse blends were made by melt blending, in multiple batches using aliquots of different polymers, at a temperature of 120° C. to 150° C. for 3 to 5 minutes in a Brabender mixer having an internal cavity of 250 ml using low shear blades rotating at speed of 15 to 20 rpm. The ethylene-based copolymers were protected during the mixing operation by having a nitrogen blanket and by the addition of 1000 ppm of a 3:1 mixture of Irganox 1076 and Irgafos 168 before mixing.

TABLE 3

| BTEC No. | Actual C2 wt % | MW (g/mol) | Mw/Mn | MRF 2.16 kg 230° C. | MFR 21.6 kg 230° C. | 1st Melt Tm, ° C. | 1st Melt Hf, J/g | 2nd Cool Tc, ° C. | 2nd Cool Hc, J/g | 2nd Melt Tm, ° C. | 2nd Melt Hf, J/g |
|---|---|---|---|---|---|---|---|---|---|---|---|
| 2 | 63.2 | 73,000 | 1.82 | 14 | 275 | 5.4, 47 | 21 | −20, 7.9 | 26 | −3.7, 31 | 17 |
| 7 | 65 | 78,000 | 1.9 | 9.7 | 198 | 13, 46 | 22 | −2.8 | 33 | 4.1 | 22 |
| 8 | 65.5 | 79,000 | 1.86 | 10 | 219 | 16, 46 | 23 | −1.2 | 37 | 8 | 27 |
| 1 | 62.5 | 76,000 | 1.84 | 13 | 244 | 2.6, 51 | 33 | −18, 3.7 | 25 | −4.6, 33 | 37 |
| 4 | 65.5 | 80,000 | 1.9 | 9.5 | 210 | 11, 46 | 30 | −2.9 | 28 | 4.5 | 27 |
| 5 | 65.6 | 78,000 | 1.93 | 9.6 | 211 | 14, 46 | 32 | 0.6 | 31 | 6.7 | 35 |
| 10 | 64.7 | 74,000 | 1.89 | 13 | 261 | 11, 46 | 32 | −7.6, 17 | 31 | 2.5 | 27 |
| 11 | 65.9 | 76,000 | 1.88 | 13 | 258 | 14, 46 | 32 | −7.7, 20 | 31 | 6.6, 48 | 32 |
| 13 | 64.2 | 76,000 | 1.89 | 11 | 257 | 9.3, 47 | 29 | −3.9 | 34 | 2.7 | 32 |
| 14 | 64.4 | 75,000 | 1.87 | 13 | 245 | 13, 45 | 39 | −6.4 | 40 | −3.3 | 28 |
| 16 | 63.4 | 83,000 | 1.93 | 9 | 182 | 2.2, 45 | 36 | −12 | 36 | −2.9 | 25 |
| 17 | 63.6 | 81,000 | 1.96 | 8.6 | 181 | 5.9, 46 | 27 | −14, 8.7 | 29 | −2.3, 44 | 24 |
| 19 | 59.7 | 86,000 | 1.85 | 8.4 | 185 | −7.1, 48 | 26 | −23, 3.9 | 23 | −12, 42 | 22 |
| 20 | 61.8 | 84,000 | 1.93 | 8.6 | 184 | 1.2, 48 | 24 | −21, 4.7 | 23 | −6.2, 36 | 22 |
| 22 | 60.3 | 86,000 | 1.9 | 8.6 | 185 | −8.0, 47 | 26 | −23, 6.5 | 25 | −11, 37 | 22 |
| 23 | 62.1 | 83,000 | 1.99 | 9.5 | 195 | 2.0, 46 | 20 | −23, 8.7 | 26 | −6.2, 41 | 23 |
| 25 | 60.7 | 83,000 | 1.93 | 8.9 | 195 | −7.1, 45 | 16 | −23, 18 | 22 | −11, 44 | 25 |
| 26 | 62.7 | 80,000 | 1.97 | 11 | 216 | 2.5, 46 | 29 | −22, 20 | 30 | −6.2, 45 | 30 |
| 15 | 65.5 | 76,000 | 1.93 | 10 | 204 | 14, 47 | 29 | −10, 19 | 32 | 4.6, 48 | 31 |
| 24 | 63 | 82,000 | 1.99 | 13 | 263 | 20, 45 | 24 | −23, 8.2 | 33 | −4.5, 33 | 29 |
| 6 | 65.5 | 71,000 | 1.81 | 14 | 309 | 16, 46 | 30 | 0 | 30 | 7.3 | 32 |
| 32 | 59.5 | 91,000 | 2.45 | 6.1 | 170 | | | | | | |
| 36 | 55.7 | 75,000 | 2.08 | 11 | 342 | | | | | | |
| 37 | 54.5 | 84,000 | 1.95 | 8.3 | 208 | | | | | | |
| 39 | 57.4 | 83,000 | 2.04 | 8.9 | 227 | | | | | | |
| 42 | 53.3 | 84,000 | 2.15 | 8.7 | 227 | | | | | | |
| 43 | 56.6 | 96,000 | 2.71 | 5.4 | 159 | | | | | | |
| 46 | 55.9 | 78,000 | 1.95 | 11 | 237 | | | | | | |
| 47 | 57.3 | 84,000 | 2.09 | 8.9 | 226 | | | | | | |
| 48 | 60.1 | 81,000 | 2.12 | 9.2 | 221 | | | | | | |
| 50 | 61.7 | 90,000 | 2.68 | 6.3 | 167 | | | | | | |
| 51 | 63 | 85,000 | 2.64 | 6.9 | 186 | | | | | | |
| 54 | 61.2 | 74,000 | 2.05 | 10 | 238 | | | | | | |
| 55 | 59.4 | 79,000 | 2.03 | 9.9 | 234 | | | | | | |
| 59 | 58.7 | 78,000 | 2.1 | 9.4 | 215 | | | | | | |
| 62 | 63.8 | 72,000 | 2.17 | 12 | 294 | | | | | | |
| 63 | 62.7 | ,000 | 2.12 | 9.4 | 224 | | | | | | |
| 70 | 63.8 | 76,000 | 2.06 | 11 | 238 | | | | | | |
| 31 | 58.5 | 93,000 | 2.3 | 6 | 165 | | | | | | |
| 34 | 55.5 | 75,000 | 2.06 | 11 | 279 | | | | | | |
| 38 | 55.8 | 84,000 | 2.1 | 8.6 | 208 | | | | | | |
| 40 | 51.6 | 79,000 | 2.05 | 12 | 272 | | | | | | |
| 41 | 53.3 | 88,000 | 2.09 | 7 | 192 | | | | | | |
| 44 | 57.1 | 97,000 | 2.53 | 5.4 | 156 | | | | | | |
| 49 | 60.3 | 96,000 | 2.61 | 6.4 | 166 | | | | | | |
| 52 | 62.7 | 85,000 | 2.38 | 7 | 171 | | | | | | |
| 56 | 62 | 86,000 | 2.24 | 7.2 | 188 | | | | | | |
| 65 | 64 | 85,000 | 2.26 | 7.5 | 182 | | | | | | |
| 66 | 62.2 | 73,000 | 2.24 | 11 | 253 | | | | | | |
| 69 | 65.1 | 84,000 | 2.23 | 7.7 | 174 | | | | | | |
| 71 | 62.7 | ,000 | 1.9 | 11 | 218 | | | | | | |

Tables 4a-4e show 10 W-50 formulation for lube oil additive polymers.

All formulations were done with 53 g of EHC 45 (a group 11 base oil with 4.6 CSt) and 31 g of EHC 60 (a group 11 base oil with 6.1 CSt), containing 1.4 g of EPR polymer, 14 g of Infineum D3426 as an additive package, 0.7 g of Infineum 9340 (400BN, a Mg sulfonate), 1 g of Infineum 9330 (300BN, calcium sulfonate), and 0.3 g of Infineum V387 as a pour point depressant.

TABLE 4a

|  | P8900G | P8900K | 36 | 37 | 39 | 42 | 46 | 47 |
|---|---|---|---|---|---|---|---|---|
| KV 100 (cSt) | 19.69 | 19.16 | 17.56 | 18.64 | 18.63 | 18.38 | 18.92 | 18.3 |
| CCS @ −20° C. (cP) | 3090 | 3150 | 3630 | 3550 | 3690 | 3460 | 3480 | 3390 |
| CCS @ −25° C. (cP) | 6,440 | 6,580 | 7090 | 6910 | 7160 | 7020 | 6720 | 6680 |
| MRV @ −25° C. (yield stress) | <35 | <35 | <35 | <35 | <35 | <35 | <35 | <35 |
| MRV @ −25° C. visc. (cP) | 15,200 | 13,700 | 15,300 | 15,700 | 16,500 | 16,600 | 15,100 | 13,700 |
| MRV @ −30° C. (yield stress) | <35 | <35 | <35 | <35 | <35 | <35 | <35 | <35 |
| MRV @ −30° C. visc. (cP) | 53,800 | 30,100 | 43,000 | 44,300 | 56,700 | 51,300 | 40,300 | 36,700 |
| Pour Point (° C.) | −40 | −41 | −39 | −41 | −41 | −39 | −39 | −41 |

TABLE 4b

|  | 48 | 54 | 55 | 59 | 62 | 63 | 70 | 31 |
|---|---|---|---|---|---|---|---|---|
| KV 100 (cSt) | 19.08 | 18.5 | 19.49 | 19.49 | 18.39 | 19.63 | 19.74 | 20.06 |
| CCS @ −20° C. (cP) | 3780 | 3460 | 3460 | 3460 | 3600 | 3770 | 3550 | 3170 |
| CCS @ −25° C. (cP) | 7140 | 6880 | 6530 | 6830 | 7080 | NA | 6870 | NA |
| MRV @ −25° C. (yield stress) | <35 | <35 | <35 | <35 | <35 | <35 | <35 | <35 |
| MRV @ −25° C. visc. (cP) | 16,700 | 13,400 | 14,700 | 14,100 | 13,600 | 15,800 | 12,300 | 19,500 |
| MRV @ −30° C. (yield stress) | <35 | <35 | <35 | <35 | <35 | <70 | <35 | >350 |
| MRV @ −30° C. visc. (cP) | 44,100 | 36,000 | 39,300 | 38,000 | 36,100 | 43,700 | 33,300 | >400,000 |
| Pour Point (° C.) | −37 | −37 | −39 | −38 | −40 | −40 | −40 | −32 |

TABLE 4c

|  | 32 | 43 | 44 | 49 | 50 | 51 | 52 | 56 |
|---|---|---|---|---|---|---|---|---|
| KV 100 (cSt) | 20.21 | 20.57 | 20.31 | 19.89 | 20.23 | 19.64 | 19.9 | 20.46 |
| CCS @ −20° C. (cP) | 3660 | 3750 | 3540 | 3400 | 3710 | 3880 | 3320 | 3370 |
| CCS @ −25° C. (cP) | NA | NA | NA | NA | NA | NA | NA | NA |
| MRV @ −25° C. (yield stress) | <35 | <35 | <35 | <35 | <35 | <105 | <35 | <35 |
| MRV @ −25° C. visc. (cP) | 18,600 | 24,700 | 21,100 | 18,800 | 18,100 | 20,900 | 15,000 | 18,400 |
| MRV @ −30° C. (yield stress) | <210 | <35 | >350 | >315 | <210 | >350 | >350 | >350 |
| MRV @ −30° C. visc. (cP) | >400,000 | >400,000 | >400,000 | >400,000 | >400,000 | >400,000 | >400,000 | >400,000 |
| Pour Point (° C.) | −37 | −35 | −31 | −32 | −36 | −38 | −32 | −32 |

TABLE 4d

|  | 65 | 69 | 33 | 45 | 60 | 73 | 34 | 38 |
|---|---|---|---|---|---|---|---|---|
| KV 100 (cSt) | 19.92 | 19.77 | 19.95 | 20.05 | 19.73 | 19.68 | 17.9 | 18.88 |
| CCS @ −20° C. (cP) | 3300 | 3280 | 3,450 | 3,640 | 3,480 | 3,480 | 3400 | 3430 |
| CCS @ −25° C. (cP) | NA | NA | 7,160 | 7,260 | 6,990 | 6,920 | 6810 | 6940 |
| MRV @ −25° C. (yield stress) | <35 | <35 | <35 | <35 | <35 | <35 | <35 | <35 |
| MRV @ −25° C. visc. (cP) | 17,800 | 14,100 | 17,400 | 18,700 | 16,800 | 14,800 | 14,400 | 15,200 |

TABLE 4d-continued

|  | 65 | 69 | 33 | 45 | 60 | 73 | 34 | 38 |
|---|---|---|---|---|---|---|---|---|
| MRV @ −30° C. (yield stress) | >350 | <70 | >350 | >350 | <280 | <140 | <35 | <35 |
| MRV @ −30° C. visc. (cP) | >400,000 | 119,000 | 400,000 | 400,000 | 296,000 | 114,000 | 38,100 | 40,200 |
| Pour Point (° C.) | −32 | −38 | −33 | −33 | −33 | −33 | −34 | −35 |

TABLE 4e

|  | 40 | 41 | 66 | 71 | 67 | 75 |
|---|---|---|---|---|---|---|
| KV 100 (cSt) | 18.25 | 19.02 | 18.74 | 18.98 | 19.35 | 19.42 |
| CCS @ −20° C. (cP) | 3490 | 3500 | 3280 | 3290 | 3,370 | 3,490 |
| CCS @ −25° C. (cP) | 6840 | 7050 | 6740 | 6800 | 6,640 | 6,990 |
| MRV @ −25° C. (yield stress) | <35 | <35 | <35 | <35 | <35 | <35 |
| MRV @ −25° C. visc. (cP) | 16,200 | 16,700 | 12,600 | 11,400 | 12,300 | 13,200 |
| MRV @ −30° C. (yield stress) | <35 | <35 | <35 | <35 | <35 | <35 |
| MRV @ −30° C. visc. (cP) | 40,700 | 44,700 | 33,200 | 30,700 | 35,600 | 41,100 |
| Pour Point (° C.) | −36 | −35 | −39 | −41 | −36 | −34 |

KV 100 Cst was determined according to ASTM D445-5. CCS at −20 C (cP) was determined according to ASTM D5293-4. CCS at −25° C. (cP) was determined according to ASTM D5293-5. MRV at −25° C. was determined according to ASTM D4684-4. MRV at −30° C. (yield stress) was determined according to ASTM D4684-5. MRV at −30° C. (viscosity) was determined according to ASTM D4684-5. Pour Point (° C.) was determined according to ASTM D5949-31.

Table 5 shows the TE and SSI values of the ethylene-based copolymers of Example 1.

TABLE 5

| EPR Polymer | KO 30 Pass | KO 90 Pass | TE |
|---|---|---|---|
| 2 | 18.41 | 22.57 | 1.96 |
| 7 | 20.32 | 25.31 | 2.12 |
| 8 | 18.87 | 23.59 | 2.09 |
| 1 | 17.56 | 21.55 | 1.95 |
| 4 | 21.55 | 26.44 | 2.09 |
| 5 | 21.36 | 26.75 | 2.1 |
| 10 | 18.46 | 23.57 | 1.97 |
| 11 | 17.02 | 21.91 | 1.98 |
| 13 | 19.13 | 24.05 | 2.03 |
| 14 | 16.34 | 20.67 | 1.7 |
| 16 | 20 | 24.81 | 2.06 |
| 17 | 22.67 | 27.32 | 2.11 |
| 19 | 23.28 | 28.33 | 2.1 |
| 20 | 22.4 | 27.41 | 2.11 |
| 22 | 23.44 | 28.24 | 2.12 |
| 23 | 22.38 | 26.89 | 2.1 |
| 25 | 22.51 | 28.36 | 2.12 |
| 26 | 21.13 | 26.04 | 2.08 |
| 15 | 16.34 | 20.23 | 1.99 |
| 24 | 20.81 | 25.65 | 2.05 |
| 36 | 17.66 | 22.12 | 1.86 |
| 37 | 24.1 | 28.62 | 2.03 |
| 39 | 22.94 | 28.87 | 2.01 |
| 42 | 25 | 28.81 | 2.01 |
| 43 | 32.54 | 36.57 | 2.21 |
| 46 | 21.68 | 25.78 | 1.98 |
| 47 | 23.9 | 27.53 | 2.01 |
| 48 | 22.26 | 26.67 | 2.01 |
| 51 | 28.14 | 32.16 | 2.14 |
| 55 | 22.35 | 26.39 | 2 |
| 59 | 20.3 | 24.66 | 2.02 |
| 62 | 14.64 | 14.64 | 1.88 |
| 63 | 20.65 | 25.04 | 2.01 |
| 32 | 28.59 | 31.67 | 2.18 |
| 50 | 28.59 | 32.87 | 2.18 |
| 54 | 19.02 | 22.15 | 1.98 |

TABLE 5-continued

| EPR Polymer | KO 30 Pass | KO 90 Pass | TE |
|---|---|---|---|
| 70 | 18 | 21.52 | 1.98 |
| 31 | 29.51 | 33.55 | 2.22 |
| 34 | 20.47 | 24.52 | 1.86 |
| 38 | 22.49 | 25.46 | 2.05 |
| 40 | 23.4 | 27.2 | 1.95 |
| 41 | 25.32 | 29.04 | 2.05 |
| 44 | 31.84 | 36.13 | 2.23 |
| 49 | 28.17 | 32.64 | 2.17 |
| 52 | 26.12 | 30.1 | 2.16 |
| 56 | 26.12 | 30.44 | 2.16 |
| 65 | 25.35 | 30.06 | 2.14 |
| 66 | 19.03 | 23.24 | 1.94 |
| 69 | 25.6 | 29.58 | 2.16 |
| 71 | 20.23 | 24.8 | 2.01 |
| 33 | 28.96 | 32.87 | 2.18 |
| 45 | 31.11 | 35.27 | 2.22 |
| 60 | 26.64 | 30.35 | 2.2 |
| 67 | 22.06 | 27.99 | 2.13 |
| 73 | 25.51 | 29.31 | 2.17 |
| 75 | 20.59 | 25.48 | 2.15 |

The TE and SSI values in Table 5 were measured for a 1 wt % polymer concentration of the ethylene-based copolymers of Example 1 in an Americas Core 150 using an ExxonMobil Group I base oil with the following lubricant properties: ASTM D445-5, Kinematic viscosity at 100° C.=5.189 cSt, ASTM D445-3, Kinematic viscosity at 40° C.=29 cSt min., ASTM D2270 Viscosity index=95 min., ASTM D92 Flash point COC=210° C. min., ASTM D97 Pour point=−15° C. max, ASTM D5800 Noack volatility=20 wt % max.

Example 2

Preparation of the mCPU Ethylene Propylene Copolymers of Example 2

Polymerizations were carried out in two stirred reactors in series with continuous introduction of the feeds to the system and continuous withdrawal of products from the system. The catalyst/activator system used was di(p-triethylsilylphenyl) methylene[(cyclopentadienyl)(2,7-di-tert-butylfluoren-9-yl)]hafnium dimethyl/N,N-dimethylanilinium tetrakis(perfluorophenyl)borate. Ethylene and propylene feeds were combined and then mixed with a prechilled isohexane stream.

A mixture of the catalyst components in toluene was pumped separately to the reactor and entered through a second port. The polymer solution exiting the first reactor entered the second reactor. A hexane solution of the monomers was fed into the second reactor through a separate port. The product from the second reactor exited through a pressure control valve that reduced the pressure to atmospheric. The reaction temperatures are shown in Tables 6a and 6b. The catalyst and activator were dissolved in toluene so that the metallocene and activator concentration listed in Tables 6a and 6b were achieved. Tri n-octyl aluminum (TNOA) was dissolved in isohexane at 3 wt % and added to the combined solvent and monomer stream just before it entered the reactor to further reduce the concentration of any catalyst poisons. The feed rate of the scavenger is listed in Tables 6a and 6b. The overall pressure in the reactor was 1,600 psi (11.02 MPa) and ethylene and propylene feed rates are listed in Tables 6a and 6b. In the process, temperature control was used to achieve the desired MFR. Additionally, the catalyst, activated externally to the reactor, was added as needed in amounts effective to maintain the target polymerization temperature. The copolymer solution emerging from the second reactor was stopped from further polymerization by addition of methanol followed by liquid phase separation. The copolymer solution was then devolatilized by removing the bulk of the isohexane to provide a concentrated solution, and then by stripping the remainder of the solvent under anhydrous conditions using a devolatilizing unit so as to end up with a molten polymer composition. The molten polymer was discharged using a single screw extruder connected to a gear pump and pelletized in an underwater pelletizer fed with chilled water. Tables 6a and 6b summarize the reaction parameters.

TABLE 6a

| mCPU example | | 1 | 2 | 3 | 4 | 5 | 6 | 7 | 8 |
|---|---|---|---|---|---|---|---|---|---|
| Reactor temp (1$^{st}$ reactor) T | (° C.) | 126.01 | 126.05 | 126.42 | 126.71 | 126.49 | 126.56 | 126.49 | 126.63 |
| Reactor temp (2$^{nd}$ reactor) T | (° C.) | 124.98 | 123.83 | 124.37 | 124.01 | 124.54 | 122.78 | 122.53 | 122.24 |
| Catalyst conc. | (g/l) | 0.13 | 0.13 | 0.13 | 0.13 | 0.25 | 0.25 | 0.25 | 0.25 |
| Catalyst conc. | (g/l) | 0.50 | 0.50 | 0.50 | 0.50 | 0.50 | 0.50 | 0.50 | 0.50 |
| Cat Feed Rate (1$^{st}$ reactor) | (cc/min) | 2.32 | 2.17 | 2.60 | 2.74 | 1.43 | 1.75 | 1.32 | 1.92 |
| Cat Feed Rate (2$^{nd}$ reactor) | (cc/min) | 1.13 | 1.07 | 1.14 | 1.13 | 1.34 | 1.13 | 1.08 | 1.10 |
| Solvent Feed Rate first reactor | (kg/hr) | 25.54 | 25.55 | 25.63 | 25.63 | 25.62 | 25.97 | 25.96 | 25.97 |
| Solvent Feed Rate 2$^{nd}$ reactor | (kg/hr) | 50.56 | 53.70 | 53.71 | 52.88 | 52.04 | 52.90 | 52.89 | 52.90 |
| C2 Feed Rate (1$^{st}$ reactor) | (kg/hr) | 2.67 | 2.67 | 2.70 | 2.70 | 2.70 | 2.78 | 2.78 | 2.78 |
| C2 Feed Rate (2$^{nd}$ reactor) | (kg/hr) | 3.61 | 3.96 | 3.96 | 3.79 | 3.63 | 3.79 | 3.79 | 3.79 |
| C3 Feed Rate (1$^{st}$ reactor) | (kg/hr) | 1.25 | 1.24 | 1.17 | 1.17 | 1.17 | 1.08 | 1.08 | 1.08 |
| C3 Feed Rate (2$^{nd}$ reactor) | (kg/hr) | 5.56 | 5.13 | 5.12 | 5.33 | 5.53 | 5.32 | 5.32 | 5.32 |
| TNOA feed rate (1$^{st}$ reactor) | (kg/hr) | 0.011 | 0.011 | 0.011 | 0.011 | 0.011 | 0.011 | 0.011 | 0.011 |
| TNOA feed rate (2$^{nd}$ reactor) | (kg/hr) | 0.009 | 0.009 | 0.009 | 0.009 | 0.009 | 0.009 | 0.009 | 0.009 |
| Polymerization rate (1$^{st}$ reactor) | (kg/hr) | 3.13 | 3.12 | 3.14 | 3.15 | 3.15 | 3.17 | 3.17 | 3.18 |
| Polymerization rate (1$^{st}$ and 2$^{nd}$ reactors) | (kg/hr) | 9.76 | 9.94 | 10.00 | 9.90 | 9.87 | 9.78 | 9.75 | 9.73 |
| Polysplit (% polymer made in the first reactor) | % | 32.05 | 31.41 | 31.37 | 31.86 | 31.89 | 32.42 | 32.48 | 32.63 |
| MFR (2$^{nd}$ reactor polymer, 230° C. 2.16 kg) | g/10 min | 4.58 | 4.55 | 4.46 | 7.20 | 9.75 | 6.44 | 4.12 | 7.19 |
| MFR (2$^{nd}$ reactor polymer, 230° C. 21.6 kg) | g/10 min | 153.09 | 154.89 | 147.37 | 233.95 | 318.45 | 212.00 | 142.73 | 235.88 |
| Ethylene content (2$^{nd}$ reactor polymer, %) | % | 54.32 | 55.85 | 57.23 | 54.90 | 53.12 | 56.21 | 56.88 | 56.06 |
| MFR (1$^{st}$ reactor polymer, 230° C. 2.16 kg) | g/10 min | 1.35 | 1.17 | 1.16 | 2.31 | 2.28 | 2.58 | 1.31 | 3.34 |
| MFR (1st reactor polymer, 230° C. 21.6 kg) | g/10 min | 54.93 | 47.92 | 45.00 | 85.15 | 85.03 | 96.19 | 53.04 | 120.38 |
| Ethylene content (1st reactor polymer, %) | % | 70.22 | 70.70 | 71.71 | 71.18 | 70.72 | 72.99 | 74.07 | 72.96 |

TABLE 6b

| mCPU example | | 9 | 10 | 11 | 12 | 13 | 14 | 15 |
|---|---|---|---|---|---|---|---|---|
| Reactor temp (1st reactor) T | (° C.) | 126.39 | 126.52 | 126.48 | 126.48 | 126.44 | 126.39 | 126.49 |
| Reactor temp (2nd reactor) T | (° C.) | 122.43 | 123.51 | 123.09 | 123.10 | 122.49 | 122.43 | 121.84 |
| Catalyst conc. | (g/l) | 0.25 | 0.23 | 0.25 | 0.25 | 0.25 | 0.25 | 0.25 |
| Catalyst conc. | (g/l) | 0.50 | 0.50 | 0.50 | 0.50 | 0.50 | 0.50 | 0.50 |
| Cat Feed Rate (1st reactor) | (cc/min) | 2.49 | 1.13 | 1.29 | 1.87 | 1.84 | 2.49 | 1.35 |
| Cat Feed Rate (2nd reactor) | (cc/min) | 1.11 | 1.12 | 1.11 | 1.18 | 1.09 | 1.11 | 1.05 |
| Solvent Feed Rate first reactor | (kg/hr) | 25.97 | 25.62 | 25.62 | 25.98 | 25.96 | 25.97 | 25.95 |
| Solvent Feed Rate 2nd reactor | (kg/hr) | 52.90 | 52.88 | 52.05 | 52.90 | 52.90 | 52.90 | 52.81 |
| C2 Feed Rate (1st reactor) | (kg/hr) | 2.78 | 2.70 | 2.70 | 2.78 | 2.78 | 2.78 | 2.78 |
| C2 Feed Rate (2nd reactor) | (kg/hr) | 3.78 | 3.79 | 3.63 | 3.79 | 3.79 | 3.78 | 3.78 |
| C3 Feed Rate (1st reactor) | (kg/hr) | 1.08 | 1.17 | 1.17 | 1.08 | 1.08 | 1.08 | 1.09 |
| C3 Feed Rate (2nd reactor) | (kg/hr) | 5.32 | 5.33 | 5.53 | 5.32 | 5.32 | 5.32 | 5.33 |
| TNOA feed rate (1st reactor) | (kg/hr) | 0.011 | 0.011 | 0.011 | 0.011 | 0.011 | 0.011 | 0.011 |
| TNOA feed rate (2nd reactor) | (kg/hr) | 0.009 | 0.009 | 0.009 | 0.009 | 0.009 | 0.009 | 0.009 |
| Polymerization rate (1st reactor) | (kg/hr) | 3.18 | 3.14 | 3.14 | 3.18 | 3.18 | 3.18 | 3.17 |
| Polymerization rate (1st and 2nd reactors) | (kg/hr) | 9.77 | 9.83 | 9.70 | 9.84 | 9.78 | 9.77 | 9.67 |
| Polysplit (% polymer made in the first reactor) | % | 31.96 | 31.94 | 32.33 | 32.34 | 32.52 | 32.52 | 32.74 |
| MFR (2nd reactor polymer, 230° C. 2.16 kg) | g/10 min | 7.37 | 5.22 | 6.29 | 8.24 | 6.71 | 7.37 | 4.19 |
| MFR (2nd reactor polymer, 230° C. 21.6 kg) | g/10 min | 235.80 | 175.58 | 200.52 | 274.52 | 212.89 | 235.80 | 141.36 |
| Ethylene content (2nd reactor polymer, %) | % | 55.85 | 54.61 | 54.09 | 55.59 | 55.86 | 55.85 | 56.62 |
| MFR (1st reactor polymer, 230° C. 2.16 kg) | g/10 min | 4.07 | 1.40 | 1.81 | 3.39 | 3.09 | 4.07 | 1.65 |
| MFR (1st reactor polymer, 230° C. 21.6 kg) | g/10 min | 142.02 | 54.29 | 72.08 | 123.68 | 108.98 | 142.02 | 64.31 |
| Ethylene content (1st reactor polymer, %) | % | 72.74 | 71.57 | 71.49 | 72.94 | 72.85 | 72.74 | 73.43 |

Tables 7a and 7b summarize the properties for the copolymers of Example 2.

TABLE 7a

| mCPU example | 1 | 2 | 3 | 4 | 5 | 6 | 7 | 8 |
|---|---|---|---|---|---|---|---|---|
| Ethylene content C2 (high ethylene polymer) | 70.22 | 70.70 | 71.71 | 71.18 | 70.72 | 72.99 | 74.07 | 72.96 |
| Ethylene content C2 (pellets) | 52.95 | 55.82 | 57.00 | 54.68 | 53.11 | 55.53 | 56.54 | 55.72 |
| MFR (high ethylene polymer, 230° C., 2.16 kg) | 1.35 | 1.17 | 1.16 | 2.31 | 2.28 | 2.58 | 1.31 | 3.34 |
| MFR (high ethylene polymer, 230° C., 21.6 kg) | 54.93 | 47.92 | 45.00 | 85.15 | 85.03 | 96.19 | 53.04 | 120.38 |
| Pellet MFR (230 C., 21.6 kg) | 221.92 | 146.31 | 123.68 | 210.53 | 290.45 | 217.78 | 129.49 | 232.96 |
| Pellet MFR (230 C., 2.16 kg) | 6.50 | 4.12 | 3.48 | 6.61 | 8.57 | 6.52 | 3.70 | 6.99 |
| Pellet MFRR | 34.14 | 35.50 | 35.54 | 31.85 | 33.89 | 33.40 | 35.00 | 33.33 |
| % High ethylene Polymer | 32.05 | 31.41 | 31.37 | 31.86 | 31.89 | 32.42 | 32.48 | 32.63 |
| % Low ethylene Polymer | 67.95 | 68.59 | 68.63 | 68.14 | 68.11 | 67.58 | 67.52 | 67.37 |

TABLE 7a-continued

| mCPU example | | 1 | 2 | 3 | 4 | 5 | 6 | 7 | 8 |
|---|---|---|---|---|---|---|---|---|---|
| TE (in ENJ102 base oil) | ASTM D445 | 1.70 | 1.79 | 1.96 | 1.79 | 1.91 | 1.77 | 1.95 | 1.80 |
| SSI (in ENJ102 base oil) | ASTM D97 | 20.20 | 22.16 | 26.51 | 23.12 | 25.13 | 21.43 | 26.05 | 21.86 |

TABLE 7b

| mCPU example | | 9 | 10 | 11 | 12 | 13 | 14 | 15 |
|---|---|---|---|---|---|---|---|---|
| Ethylene content C2 (high ethylene polymer) | | 72.74 | 71.57 | 71.49 | 72.94 | 72.85 | 72.74 | 73.43 |
| Ethylene content C2 (pellets) | | 55.72 | 54.96 | 53.84 | 55.39 | 55.87 | 55.72 | 56.36 |
| MFR (high ethylene polymer, 230° C., 2.16 kg) | | 4.07 | 1.40 | 1.81 | 3.39 | 3.09 | 4.07 | 1.65 |
| MFR (high ethylene polymer, 230° C., 21.6 kg) | | 142.02 | 54.29 | 72.08 | 123.68 | 108.98 | 142.02 | 64.31 |
| Pellet MFR (230° C., 21.6 kg) | | 218.63 | 172.83 | 186.01 | 253.03 | 180.84 | 218.63 | 126.66 |
| Pellet MFR (230° C., 2.16 kg) | | 6.71 | 4.97 | 5.49 | 7.54 | 5.36 | 6.71 | 3.63 |
| Pellet MFRR | | 32.58 | 34.77 | 33.88 | 33.56 | 33.74 | 32.58 | 34.89 |
| % High ethylene Polymer | | 31.96 | 31.94 | 32.33 | 32.34 | 32.52 | 32.52 | 32.74 |
| % Low ethylene Polymer | | 68.04 | 68.06 | 67.67 | 67.66 | 67.48 | 67.48 | 67.26 |
| TE (in ENJ102 base oil) | ASTM D445 | | | | | | | |
| SSI (in ENJ102 base oil) | ASTM D97 | | | | | | | |

The TE and SSI values in Table 7a (mCPU examples 1-8) were measured for a 1 wt % polymer concentration in ENJ102 base oil.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A polymeric composition, comprising:
   a first ethylene-based copolymer having a weight percent of ethylene-derived units based on a weight of the polymeric composition ($E_A$) ranging from about 47 wt % to about 52 wt % and a weight-average molecular weight ($Mw_A$) of from 60,000 to 130,000; and
   a second ethylene-based copolymer having a weight percent of ethylene-derived units based on the weight of the polymeric composition ($E_B$) ranging from about 65 wt % to about 85 wt % and a weight-average molecular weight ($Mw_B$) of from 70,000 to less than 130,000;
   wherein the molecular weight distribution (MWD) of the first ethylene-based copolymer is less than 2.4 and the MWD of the second ethylene-based copolymer is less than 2.4,
   wherein the polymeric composition comprises the first ethylene-based copolymer in an amount of at least 33 wt %, based on the combined weight of the first and second ethylene-based copolymers,
   wherein the polymeric composition comprises from about 51.6 wt % to about 62.7 wt % ethylene-derived units, based on the weight of the polymeric composition, and
   wherein the polymeric composition has a weight average molecular weight (Mw) of from about 77,000 to about 88,000 and a MWD of from about 1.9 to about 2.15.

2. The polymeric composition of claim 1, wherein at least one of the first ethylene-based copolymer and the second ethylene-based copolymer has a substantially linear structure.

3. The polymeric composition according to claim 1, wherein the first ethylene-based copolymer has a heat of fusion on a first melt of the first ethylene-based copolymer ($H_A$) of less than 10 J/g.

4. The polymeric composition according to claim 1, wherein at least one of the first ethylene-based copolymer and the second ethylene-based copolymer has a molecular weight distribution (MWD) of about 2.2 or less.

5. The polymeric composition according to claim 1, wherein the molecular weight distribution (MWD) of the first ethylene-based copolymer and the molecular weight distribution (MWD) of the second ethylene-based copolymer is in the range from greater than or equal to 1.80 to less than or equal to 2.2.

6. The polymeric composition according to claim 1, wherein a difference between the weight percent of ethylene-derived units of the second ethylene-based copolymer ($E_B$) and weight percent of ethylene-derived units of the first ethylene-based copolymer ($E_A$) is greater than or equal to 17.

7. The polymeric composition according to claim 1, wherein a ratio of a melt index of the first ethylene-based copolymer ($MI_A$) to a melt index of the second ethylene-based copolymer ($MI_B$) is less than or equal to 3.0.

8. The polymeric composition according to claim 1, wherein the weight-average molecular weight of the first ethylene-based copolymer ($Mw_A$) ranges from about 70,000 to about 130,000.

9. The polymeric composition according to claim 1, wherein the weight-average molecular weight of the second ethylene-based copolymer ($Mw_B$) ranges from 75,000 to about 115,000.

10. The polymeric composition according to claim 1, wherein at least one of the first ethylene-based copolymer and the second ethylene-based copolymer comprise ethylene and a comonomer selected from the group consisting of propylene, butene, hexene, octene, and mixtures thereof.

11. The polymeric composition according to claim 1, wherein at least one of the first ethylene-based copolymer and the second ethylene-based copolymer comprise ethylene and a comonomer selected from the group consisting of propylene, butene, hexene, octene, and mixtures thereof, and wherein the comonomer of at least one of the first ethylene-based copolymer and the second ethylene-based copolymer further comprises a polyene monomer, and the polymeric composition further comprises up to 5 mol % polyene-derived units.

12. The polymeric composition according to claim 1, wherein a weight percent of the first ethylene-based copolymer is less than or equal to 66 wt % of the total weight of the first ethylene-based copolymer and the second ethylene-based copolymer.

13. The polymeric composition according to claim 1, wherein a heat of fusion on a first melt of the first ethylene-based copolymer ($H_A$) is less than a heat of fusion on a first melt of the second ethylene-based copolymer ($H_B$).

14. A lubrication oil composition comprising a base oil; and the polymeric composition according to claim 1.

15. The lubrication oil composition of claim 14 having at least one of: a TE of greater than or equal to 1.5; a SSI of less than 55; a complex viscosity at −31° C. of less than or equal to 500 cSt; and a Mini Rotary Viscometer (MRV) viscosity at −35° C. in a 10 W-50 formulation of less than 60,000 cps according to ASTM 1678.

16. A method for making a polymer composition comprising the steps of:
(a) combining (i) a first ethylene-based copolymer having a weight percent of ethylene-derived units based on a weight of the polymeric composition ($E_A$) ranging from about 47 wt % to about 52 wt % and a weight-average molecular weight ($Mw_A$) of from 60,000 to 130,000 with (ii) a second ethylene-based copolymer having a weight percent of ethylene-derived units based on the weight of the polymeric composition ($E_B$) ranging from about 65 wt % to about 85 wt % and a weight-average molecular weight ($Mw_B$) of from 70,000 to less than 130,000 less than 130,000, wherein the molecular weight distribution (MWD) of the first ethylene-based copolymer is less than 2.4 and the MWD of the second ethylene-based copolymer is less than 2.4; and
(b) forming the composition, wherein the composition comprises the first ethylene-based copolymer in an amount of at least 33 wt %, based on the combined weight of the first and second ethylene-based copolymers, wherein the polymeric composition comprises from about 51.6 wt % to about 62.7 wt % ethylene-derived units, based on the weight of the polymeric composition, and wherein the polymeric composition has a weight average molecular weight (Mw) of from about 77,000 to about 88,000 and a MWD of from about 1.9 to about 2.15.

17. The polymeric compositions according to claim 1, wherein the polymeric composition has a Mw/Mn of 1.95 to 2.15.

18. The polymeric composition according to claim 1, wherein the polymeric composition has an ethylene content of greater than or equal to 53.3 wt % to less than or equal to 62.7 wt %, based on the weight of the polymeric composition.

19. The polymeric composition according to claim 1, wherein the composition comprises the first ethylene-based copolymer in an amount of at least 50 wt % to less than or equal to 80 wt %, based on the combined weight of the first and second ethylene-based copolymers, and the second ethylene-based copolymer in an amount of from at least 20 wt % to less than or equal to 50 wt %.

20. The polymeric composition according to claim 1, wherein the composition comprises the first ethylene-based copolymer in an amount of at least 50 wt % to less than or equal to 70 wt %, based on the combined weight of the first and second ethylene-based copolymers, and the second ethylene-based copolymer in an amount of from at least 30 wt % to less than or equal to 50 wt %.

21. The polymeric composition according to claim 1, wherein the composition comprises the first ethylene-based copolymer in an amount of at least 60 wt % to less than or equal to 80 wt %, based on the combined weight of the first and second ethylene-based copolymers, and the second ethylene-based copolymer in an amount of from at least 20 wt % to less than or equal to 40 wt %.

* * * * *